United States Patent
Sharp et al.

(10) Patent No.: US 7,249,087 B2
(45) Date of Patent: Jul. 24, 2007

(54) FREIGHT TRANSPORTATION MARKETPLACE

(75) Inventors: Jesse Sharp, Fort Worth, TX (US); Joseph Derajtys, Keller, TX (US); Michael McCormick, North Richland Hills, TX (US); Paul Bischler, Keller, TX (US); Randy Schuessler, Fort Worth, TX (US); Rick Whitmore, Keller, TX (US)

(73) Assignee: Freightwise Corporation, Fort Worth, TX (US)

( * ) Notice: Subject to any disclaimer, the term of this patent is extended or adjusted under 35 U.S.C. 154(b) by 1201 days.

(21) Appl. No.: 09/781,604

(22) Filed: Feb. 12, 2001

(65) Prior Publication Data

US 2002/0111892 A1  Aug. 15, 2002

(51) Int. Cl.
 *G06Q 40/00* (2006.01)
 *G06F 40/00* (2006.01)
(52) U.S. Cl. .......................................... 705/37; 705/1
(58) Field of Classification Search ............ 705/10–42
 See application file for complete search history.

(56) References Cited

U.S. PATENT DOCUMENTS

| | | | | |
|---|---|---|---|---|
| 4,799,156 A | * | 1/1989 | Shavit et al. ............... | 705/26 |
| 5,721,832 A | * | 2/1998 | Westrope et al. ............. | 705/27 |
| 5,728,359 A | * | 3/1998 | Nip ............................ | 423/306 |
| 6,023,683 A | * | 2/2000 | Johnson et al. ............... | 705/26 |
| 6,598,027 B1 | * | 7/2003 | Breen et al. .................. | 705/26 |
| 6,845,364 B1 | * | 1/2005 | Pool et al. .................... | 705/26 |

* cited by examiner

*Primary Examiner*—Frantzy Poinvil
(74) *Attorney, Agent, or Firm*—Mayer, Brown, Rowe & Maw

(57) ABSTRACT

This invention relates to a marketplace and management system related thereto. In particular, it relates to a marketplace for freight transportation and the systems necessary to support such a marketplace. It is a comprehensive system that acts as an intermediary between buyers and sellers of freight transportation and provides the related support services. The marketplace generally operates over a network using a user interface with various levels of integration. The marketplace facilitates sales of freight transportation services, including multi-leg and multi-modal freight transportation services through several systems including, catalog rates and auctions. The related services provided by the marketplace allow buyers and sellers to enroll in the marketplace, maintain their accounts, and track their operations within the marketplace. Sellers can also manage the rates they charge for providing freight transportation. The marketplace also creates a binding agreement between buyers and sellers called a tender agreement that may be modified even after it has been consummated. Additionally, the marketplace ensures and guarantees payment to the sellers and may perform collection and invoicing functions.

37 Claims, 15 Drawing Sheets

| | No Status | Entered | Auction | Pending | Accepted | En Route | Delivered | History | Rejected | Cancelled | Retracted |
|---|---|---|---|---|---|---|---|---|---|---|---|
| Order-freight | create | revise cancel | N/A | revise cancel | -- | -- | -- | view | create | -revise order -order another | -- |
| -demand | -- | -- | N/A | accept reject | -- | -- | -- | -- | accept another | accept another | -- |
| Catalog Rates | | | N/A | -- | order | N/A | N/A | -- | -- | -- | N/A |
| Auction-buyer's | create | revise cancel | revise cancel | N/A | -- | -- | -- | view | -- | create another | |
| -seller's | -- | -- | order revise cancel | N/A | -- | -- | -- | -- | -- | -- | |
| Tender Agreement (TA) | N/A | -- | -- | For buyer's auction- accept reject reject with comments | Retract | Retract | -- | view | start again | N/A | start again |

FIG. 14

| | No Status | Entered | Auction | Pending | Accepted | En Route | Delivered | History | Rejected | Cancelled | Retracted |
|---|---|---|---|---|---|---|---|---|---|---|---|
| Order-freight | -- | accept | N/A | accept reject (accept and continue, accept and stop) | -- | -- | -- | -- | accept another | accept another | -- |
| -demand | create | revise cancel | N/A | revise cancel | -- | -- | -- | view | -revise -order another | -revise -order another | -- |
| Catalog Rates | enter | -- | -- | revise delete | revise delete | N/A | N/A | view | revise delete enter new rates | enter new rates | |
| Auction-buyer's | -- | -- | order | N/A | -- | -- | -- | -- | -- | order another | -- |
| -seller's | create | revise cancel | revise cancel | N/A | -- | -- | -- | view | -- | create another | -- |
| Tender Agreement (TA) | N/A | N/A | N/A | For seller's auction and catalog rates- accept reject reject with comments | retract | retract | -- | view | start again | N/A | start again |

FIG. 15

FREIGHT TRANSPORTATION MARKETPLACE

FIELD OF THE INVENTION

This invention relates to a marketplace and management system related thereto. In particular, it relates to a marketplace for freight transportation, the systems necessary to support such a marketplace and the embodiment of such a marketplace and support systems over a network.

BACKGROUND OF THE INVENTION

Many of the existing internet-based transportation-related sites are simply bulletin boards for posting freight transportation supply and demand and do not provide many of services and capabilities needed by the buyers and sellers of freight transportation services, such as allowing the execution of tender agreements, matching the needs of the buyers with the capabilities of the sellers, providing automated tendering and payment processes and providing mechanisms for dealing with unexpected events and resolving disputes.

For instance, the traditional internet-based transportation-related sites do not allow buyers and seller to execute their transactions over a network. Instead, buyers and sellers must contact each other off-line in order to transact with each other. Additionally, many do not provide any way to match the loads a buyers need to transport with the capacities sellers have to offer. Another important shortcoming of tradition internet-based transportation-related sites is that they provide no way of tracking and tracing shipments while they are en-route, particularly when transportation is provided by multiple carriers and across multiple modes of transportation. In fact, most traditional sites do not facilitate multi-modal transactions at all.

SUMMARY OF THE INVENTION

The present invention relates to a marketplace for the buying and selling of goods and services. The marketplace is a facilitator of buying and selling goods and services. The marketplace also provides the services that support this buying and selling. These support services allow customers to enroll in the marketplace, maintain their accounts, and track their activities within the marketplace. Sellers can also manage the rates they charge for providing goods and services. Additionally, the marketplace creates a binding agreement between buyers and sellers called a tender agreement that may be modified even after it has been consummated. Additionally, the marketplace ensures and guarantees payment to the sellers and may perform collection and invoicing functions.

In particular, the present invention relates to a marketplace for the buying and selling of freight transportation services, including multi-leg freight transportation services. Freight transportation services include the services and equipment involved in and associated with transporting freight, wherein freight includes, but is not limited to goods, packages, express mail, air freight and bulk cargo. Freight transportation services may include, but are not limited to, trucking, rail, air, ocean vessels, barges, pipelines, warehousing and all associated and related equipment and services. In the freight transportation marketplace, the freight transportation services are sold by sellers who generally include carriers and third-party logistics providers or "3PL's" (transportation service providers that act on behalf of either a shipper or a carrier), and are purchased by buyers who generally include shippers, receivers, carriers and 3PL's.

The freight transportation marketplace (the "marketplace") is comprehensive system that acts as an intermediary and facilitator among buyers and sellers of freight transportation services and provides the related support services. The marketplace operates in real-time and across multiple transportation modes and generally operates over a network. The marketplace utilizes a user interface portion that provides varying levels of interaction with the customers and their computer systems and comprises the following major subsystems: an account management system, a buy/sell system, an order fulfillment system and an action defining system. The buy/sell system is the system that generally facilitates the buying and selling activities. It enables freight transportation to be bought and sold through catalog rates and auctions, allows users to find freight transportation services that match their criteria, creates the price for the freight transportation services and creates a binding agreement between buyers and sellers (a "tender agreement"). The account management system and the order fulfillment system provide services that support the buy/sell system such as, managing user accounts, tracking user activities, guaranteeing payment to sellers, and other services. The action defining system drives the other systems by defining at any point in time the actions that may be taken by a user of the marketplace and the consequences that will result from taking a particular action at a particular point in time.

The account management system manages all aspects of customer accounts and generally comprises an account maintenance system, a rate management system, and a track and trace system. The account management system, may also include a reporting system, a customer service system, and an enrollment system.

One of the subsystems of the account management system is the enrollment system. The enrollment system is the system by which potential customers are enticed to enroll and are enrolled in the marketplace. Enrollment is the process by which potential customers become customers and are thereby granted access to the marketplace. The enrollment system comprises an introduction component, a demonstration component and an enrollment processing system. The introduction and demonstration components are used to entice potential customers to enroll with the marketplace while the enrollment processing system performs the actual enrollment. The introduction component is the system that gives potential customers an overview of the features and benefits of the marketplace. The demonstration component is a system that gives potential customers a demonstration of the marketplace's features and operation. The enrollment processing system is the process used to evaluate and enroll potential customers. Only the potential customers that meet the predetermined marketplace criteria for customers will be enrolled into the marketplace. Additionally, the enrollment processing system may be used to identify potential customers.

Once customers are enrolled in the marketplace, the account maintenance system, establishes and structures accounts for the customers. Accounts are the mechanism that allows customers to access and utilize the marketplace. In one embodiment, the account maintenance system is structured by a hierarchical account structure. The hierarchical account structure generally includes three levels, the payor group level which comprises at least one payor group, the user group level which comprises at least one user group, and the user level which comprises at least one user. Each payor group generally comprises a single customer and is generally subdivided into user groups. Each user group defines at least one user. The users are generally the individuals that use the marketplace.

The hierarchical account structure provides organization and security for customers and the marketplace by allowing customers to assign roles at the user, user group and payor group levels wherein the roles include, but are not limited to, buyer and seller. Each user, user group and/or payor group may be assigned more than one role. A role, whether assigned at the payor group, user group or user level, or at more than one of these levels, determines scope and privileges of user or users within the group to which it is assigned. Each role has a scope and at least one privilege with which it is associated. The scope associated with a role defines the level of information that may be viewed and/or transacted upon by a user. Assigning roles (and the scope associated with those roles) provides data level security by allowing a customer to dictate which of its users have access to what information. The privileges associated with a role define the operations or actions that the user may perform. This provides functional security by allowing customers to dictate the actions that each user in its payor group may perform.

The account maintenance system may further include profiles. When customers and their users enroll in the marketplace, or at some later time, the marketplace creates profiles that are updated regularly. These profiles include, user profiles, seller profiles, buyer profiles and location profiles. These profiles are used by the account maintenance system to enable customers to manage their accounts, by the buy/sell system to provide users with information regarding other users with whom they may be contemplating a transaction, and by the pricing system to create the price that will be included in the tender agreement.

The account management system further includes a rate management system, which allows sellers to manage the fees they charge for providing freight transportation services. The rate management system enables sellers to easily and efficiently change and/or capture various charges and fees for the freight transportation services provided. The rate management system includes systems that allow the seller to manage catalog rates ("catalog rate management system"), fuel surcharge fees ("fuel surcharge management system") and accessorial fees ("accessorial fee management system"). Additionally, the rate management system allows sellers to communicate to the marketplace that they are willing to be part of marketplace-created multi-leg freight transportation services (discussed below). The catalog rate management system enables sellers to sell freight transportation from catalog rates. Catalog rates are the fees for freight transportation services that are generally available, and are sometimes referred to as "published rates." The fuel surcharge management system enables a seller to set and update fuel surcharges. Fuel surcharges are fees imposed on a buyer by the seller for the cost of fuel used in providing freight transportation. The general purpose of the fuel surcharge is to compensate the seller for any increase in fuel costs over those assumed when the catalog or other rates charged for the actual freight transportation services were made available to the marketplace. The accessorial fee management system, is the system by which sellers manage their accessorial fees. Accessorial fees are miscellaneous fees incurred by the seller when providing freight transportation. This is generally accomplished through seller's tariff rules which the seller establishes with the marketplace. In addition to the account management system, the marketplace enables several different ways that a seller may deal with accessorial fees, such as, through the tender agreement creation system and through the accessorial fee update system.

The track and trace system, is the mechanism used by the marketplace for tracking the life cycle of auctions, orders and tender agreements, and triggering certain occurrences within the marketplace. The track and trace system tracks the life cycle of auctions, orders and tender agreements in part by providing an event trail and/or history log. This history log is accessible to users. However, the extent of a given user's access to the history log depends in part on that user's role. Additionally, the track and trace system triggers occurrences in other systems in the marketplace. These occurrences include, but are not limited to, sending messages to users and/or triggering the automated payment and distribution system.

The track and trace system operates by archiving track and trace events. Track and trace events are predetermined user actions or other events for which the marketplace maintains records and defines as track and trace events. Track and trace events may, additionally, trigger occurrences within the marketplace Track and trace events may be created automatically by the marketplace in response to the occurrence of predetermined actions or events associated with an order, auction, query or notice (discussed below). Thus, when one of the predetermined events or actions occurs, the marketplace recognizes the occurrence and stores information relating to the occurrence in the history log. Information such as, the date and time of occurrence, the action or event that occurred, the occurrence triggered by the track and trace event and any other relevant information as determined by the marketplace.

The account management system also includes a reporting system and a customer service system that helps users in using the marketplace. The reporting system generates reports for users. Reports can be generated that summarize the operations, tender agreements, catalog rates, and any other aspect of an account or transaction. However, users only have access to the reports that the scope associated with that user's role permits. The customer service system enables the marketplace to log, resolve and assist in resolving any issues, questions or problems encountered by users or customers and to train users and customers in the use of the marketplace.

Another major subsystem of the marketplace is the buy/sell system. The buy/sell system is the system that facilitates buyers purchasing and sellers selling single-leg and multi-leg freight transportation services through the creation of tender agreements. The buy/sell system enables the sale of freight transportation services through catalog rates (a "catalog sales system") and through auctions (an "auction sales system"). A matching system enables users to find catalog rates and auctions of interest by entering queries into the marketplace that indicate the desired criteria. Once a user has located a catalog rate or auction of interest and responded to it (placed an "order"), the tender agreement creation system creates a tender agreement. This tender agreement is not only the primary means by which the buyer and seller communicate, but becomes a binding agreement between buyer and seller that specifies the terms under which the freight transportation services will be provided once it has been consummated. The price included in the tender agreement is generated by a pricing system that generates a price using the catalog rates or auctioned rates and any applicable fees and discounts.

The buy/sell system enables sellers to sell and buyers to purchase both single-leg and multi-leg (including multi-modal) freight transportation services Multi-leg freight transportation services are freight transportation services that involve more than one trip or leg. At a minimum, they consist of a trip between the location from where the freight is to be picked up (as agreed to in the tender agreement) and an intermediary location, and the intermediary location and the ultimate destination of the freight (as agreed to in the tender agreement). However, multi-leg freight transportation services may involve trips to several intermediary locations. Generally, multi-leg freight transportation services are provided by a plurality of sellers (at least two) each providing the freight transportation services for a single leg. However, a seller may provide the freight transportation services for more than one leg. Multi-modal freight transportation services are multi-leg freight transportation services wherein the freight transportation service is provided using at least two modes of transportation that include, but are not limited to, rail, truck, ocean, air, parcel, rail carload, less-than-truckload, and any other method or means of moving goods.

Multi-leg freight transportation services, are generally provided by a plurality of sellers. However, the buy/sell system enables a buyer to effectively transact with only one seller. The plurality of sellers providing the multi-leg freight transportation services will generally include, an accepting party and an equipment party. However, the accepting party and the equipment party may be the same seller. The accepting party is the seller that is responsible to the marketplace and the buyer for the freight transportation service offered, and has authority to bind the other sellers and make certain decisions on behalf of the other sellers. Therefore, a buyer that purchases multi-leg freight transportation services, transacts with the accepting party in the same way that buyer would transact with the seller providing single-leg freight transportation services. The equipment party is the seller who owns or controls the equipment, such as a trailer, container, train car, etc., which will travel with the freight throughout the provision of the freight transportation services. This equipment party makes the equipment available to the other sellers involved in providing the multi-leg freight transportation services so that the same piece of equipment can move with the freight, thus eliminating the need to unload or unpack and reload or repack the freight.

There are two ways in which the buy/sell system facilitates the provision of multi-leg transportation services. The first way is for a group of sellers to agree amongst themselves to provide the multi-leg freight transportation services together ("seller-created multi-leg freight transportation services") and the terms under which they will provide the service. The second is for the marketplace to create multi-leg freight transportation services ("marketplace-created multi-leg freight transportation services") from among sellers who have indicated that they are willing to provide part of such services ("willing sellers").

The buy/sell system allows a group of sellers who have agreed amongst themselves to provide seller-created multi-leg freight transportation services, to offer such seller-created multi-leg freight transportation services in the marketplace. Such a group of sellers will agree amongst themselves which seller is to be the accepting party, which is to be the equipment party and the exact services and/or equipment each seller will provide. The accepting party will then interact with the marketplace and buyers with regard to the services the group of sellers has agreed to offer collectively. This means that it is the accepting party who is responsible for supplying the catalog rate or auction information for the entire multi-leg freight transportation service (the aggregate of the services provided and rates charged by each seller) to the marketplace and is ultimately responsible to the buyer for the services.

Additionally, the marketplace itself can create multi-leg transportation services by combining the services of at least two willing sellers. Sellers who wish to be willing sellers indicate to the marketplace that they are so willing, the services they are willing to perform and the rate at which they are willing to perform them in the seller's profile. When a buyer enters a query, the buy/sell system will (in addition to searching for any other matches) create marketplace-created multi-leg freight transportation services that match the criteria set forth in the buyer's query by combining the services of at least two willing sellers one of which has the necessary equipment. Once the marketplace has created a marketplace-created multi-leg freight transportation service, as a default, it appoints the seller who will provide the services for the first leg the accepting party and the seller that has the necessary equipment the equipment party. However, the equipment party then has the power to appoint any seller, including itself, involved in the marketplace-created multi-leg freight transportation services as the accepting party.

In the buy/sell system, freight transportation services may be purchased and sold through the catalog sales system and the auction sales system. The catalog sales system enables sellers to sell and buyers to purchase freight transportation services through catalog or "published" rates, wherein sellers may make the catalog rates available to buyers through the catalog rate management system.

The auction sales system enables buyers to auction their need for ("buyer's auction"), and sellers to auction their ability to provide ("seller's auction") freight transportation services. In the auction sales system, users make available their need for or their ability to provide freight transportation services in the marketplace as an invitation to other users to make offers with regard to the provision or purchase of needed or available freight transportation services. The users creating the auction are then free to accept any or none of the offers or "orders" (also known as "bids"). The auction sales system may also include a feature that enables sellers to auction capacity and buyers to auction demand for capacity on different pieces of equipment separately, but in a single auction (an "accept and continue feature"). The auction sales system may also include a feature that enables communication between buyers and sellers regarding an auction (a "reject with comments feature"). The reject with comments feature enables users who have created an auction to communicate to users who have placed orders on their auction that they are willing to accept the order but on terms different from those presented in the order.

The auction sales system is triggered when a buyer or seller enters an auction into the marketplace or when a buyer or seller enters a query and then places an order on an auction. Only sellers can create seller's auctions and only buyers can create buyer's auctions. This limitation may be implemented through the privileges assigned to the buyer and seller roles or directly in the buy/sell system. Users creating auctions may use information stored in their location profiles to provide some of information and criteria for the auction.

Users locate auctions and catalog rates of interest by using the matching system. The matching system allows users to find freight transportation services or demands for freight transportation services that match criteria of the freight transportation services they desire, or the freight transportation services they have to offer, respectively, by finding "matches" in response to queries placed by users. Buyers seeking freight transportation services place freight queries that include the criteria of the desired freight transportation services. Sellers seeking demand for freight transportation services place demand queries that include the criteria of the freight transportation services the seller has to offer. The matching system searches the catalog rates and auctions within the system and returns as matches those catalog rates and auctions that match the criteria set forth in the query, including single-leg ("single-leg matches"), multi-leg ("multi-leg matches"), multi-modal ("multi-modal matches,"), catalog rates and auctions.

After the matches are presented to the user, the user is then free to make a response to any match (place an "order" or "bid") or make no response at all. If a user chooses to place an order, the user may assign an expiration date to that order with the effect that the order will not be valid beyond that expiration date. Once an order is placed, the marketplace then creates a purchase event (this purchase event can also be defined as a track and trace event). This triggers the pricing system to create the price that will be included in the tender agreement (the "price"), and the tender agreement creation system to begin the creation of a tender agreement. The terms of the tender agreement generally come from several sources including the pricing system which provides the price, the sellers rules tariffs (which are stored in the seller's profile) and any generally applicable rules that the marketplace has established ("marketplace rules"). Once the buyer and the seller have accepted the tender agreement the agreement is consummated which means it becomes binding. Users that have placed a bid on an auction are deemed to have accepted the tender agreement at the time they placed the bid.

The tender agreement creation system is the system that creates a tender agreement between a buyer and seller in response to the creation of a purchase event. Purchase events include, but are not limited to, the placement of a catalog order and the acceptance of a freight order or a demand order. The tender agreement is a binding agreement between a buyer and seller of freight transportation services that includes the terms for the provision of freight transportation services, including the price generated by the pricing system.

The tender agreement creation system may also permit the parties to execute some changes and updates to the tender agreement after the tender agreement has been consummated. The buyer and seller may seek clarification, update information, seek deviation from the seller's rules tariffs, and request other changes to the tender agreement by entering information into the "notes" section of the tender agreement and submitting the tender agreement to the marketplace which then forwards it to the other user. The other user may then also enter information into the notes section and forward the tender agreement to the marketplace wherein the marketplace forwards it back to the first user. This process may be repeated until the users have reached a conclusion.

The price for freight transportation services that is incorporated into the tender agreement (the "price") is determined by the pricing system. The price actually includes two separate amounts, the "buyer's price" and the "seller's price." The buyer's price is the total amount the buyer is to pay for the freight transportation services they are buying, which includes the amounts charged by the seller, or sellers (the "seller's charges") plus any fees and discounts applied by the marketplace ("marketplace fees"). The seller's price is the total amount the seller will receive for providing the freight transportation services, which includes the seller's charges minus the marketplace fees. The seller's charges is the total amount charged by the seller for providing the freight transportation services including the fees for providing the service, fuel surcharges and accessorial fees. For services purchased through an auction, the seller's charges is the final auction price. Catalog rates, however, do not include fuel surcharge fees or accessorial fees. Therefore, for services purchased from catalog rates, the pricing system generally obtains the fuel surcharges from the fuel surcharge management system and accessorial fees from the accessorial fee management system and adds them to the catalog rate to obtain the seller's charges.

The price generally include the seller's charges and any marketplace fees. In the buyer's price, the marketplace fees are added to the seller's charges. In the seller's price, the marketplace fees are subtracted from the seller's charges. The marketplace fees may include exchange transaction fees, payment option fees and cancellation fees. The marketplace fees may also include discounts, such as, payment method discounts. The exchange transaction fees are for the use of the marketplace and are imposed on all users that consummate a tender agreement. The cancellation fees are imposed on any user that revoked a tender agreement after it was consummated. The payment option fee is a fee charged to buyers which is proportional to the time period following proof of delivery after which funds are removed from the buyer's account. The payment method discount is a discount given to users who have authorized payment directly from an account other than one with a credit card company.

Within the buy/sell system, users have varying levels of ability to view each other's profiles and the history log associated with orders and tender agreements. A user's ability to view profiles and history logs is determined, in part, by the scope associated with the user's role. A buyer may view a seller profile at any time that seller has freight transportation services offered for sale either as catalog rates, through an auction or as a demand order placed in response to the buyer's auction. A buyer may also view the history log of the orders and auctions the buyer created and the tender agreements to which the buyer is a party. A seller may only view the buyer profiles of buyers that have either submitted an order in response to the seller's catalog rates or auctions, or initiated an auction. Sellers may view the history log of the orders and auctions that the seller created and the tender agreements to which the seller is a party.

The freight transportation marketplace also includes an order fulfillment system. The order fulfillment system is the system that enables order fulfillment which is the process of taking a tender agreement from approval through proof of delivery ("POD") and the collection of payment. In other words, the order fulfillment system enables the fulfillment of the tender agreement. Included in the order fulfillment system are subsystems that deal with changes in circumstances (an "exception management system" and an "accessorial fee update system"), and facilitate payment (a "payment system," a "collection system" and an "invoicing system").

The exception management system enables users to modify the tender agreement after the tender agreement has been consummated. In one embodiment, the exception management system provides the rules by which changes may be made to the tender agreement and enables the buyer and seller to communicate to each other their desire for a change in the tender agreement. Alternatively, or additionally, the buyer and seller may make alternative, mutually agreed upon changes which are facilitated by the marketplace.

Another of the order fulfillment subsystems that deals with changes is the accessorial fee update system. The accessorial fee update system enables sellers to recover accessorial fees not otherwise provided for by the accessorial fee management system. When a seller first becomes aware of an event likely to result in an accessorial fee being assessed against the buyer (an "accessorial event"), the seller gives the marketplace an initial notification, wherein the accessorial fee update system then determines if the accessorial event is legitimate. If the accessorial event is legitimate, the buyer is given the opportunity to approve the accessorial event. If the buyer does not approve the event or if the event is not legitimate, the accessorial fee update system notifies the seller and instructs the seller not to proceed with the accessorial event. If the buyer approves the accessorial event, the accessorial fee update system notifies the seller. When the accessorial event appears imminent, the seller gives the accessorial fee update system final notice of the accessorial event, which in turn notifies the buyer. The buyer then gives final approval and the accessorial fee update system notifies the seller and instructs the tender agreement creation system to update the tender agreement. The tender agreement creation system then updates the tender agreement to reflect the changes in the accessorial fees.

One of the subsystems of the order fulfillment system that facilitates payment is the payment system. The payment system provides and guarantees payment to sellers and allows users to establish payment accounts. The marketplace generally guarantees that the seller will get paid if the seller provides proof of delivery even in the event that the buyer does not or cannot pay. Payment is provided through an automated payment and distribution system that automatically removes funds from the buyer's payment account and places them in the seller's payment account upon the occurrence of predefined events which may be defined as track and trace events. The marketplace may guarantee all the seller's charges or only a portion of them.

The other subsystems that may be included in the order fulfillment system that facilitate payment are the collection and invoicing systems. The collection and invoicing systems are the systems by which the marketplace collects funds from users. It may be used instead of or in addition to the payment system. In one embodiment, it is used as a supplement or backup to the pricing system. The invoicing system records all transactions and sees to it that invoices are sent to customers containing information regarding their payment accounts and summarizing any amounts due to the marketplace. The act of sending the actual invoices may be performed by the marketplace or contracted out to an outside entity.

The final major subsystem of marketplace is the action defining system. The action defining system is a system for defining at a given point in time, the possible actions that may be taken by a user of the marketplace and the consequences that will result from a user taking a particular action. In the action defining system, the possible actions are defined by user roles, and event type and status. Each role is associated with a privilege that defines the possible actions that a user may take and a scope that defines the information to which a user has access with regard to a particular "type" of event. The state or situation of a type is indicated by its "status." A type and status pair defines the state or situation of an event at a given point in time. The privilege associated with the role assigned to a user defines the possible actions in which the user may engage and the scope defines the information that the user may view. The type and status restrict the range of possible actions in which the user may engage and the information which the user may view with respect to a given event at a particular point in time.

It is to be understood that both the foregoing general description and the following detailed description are exemplary and are intended to provide further explanation of the invention claimed.

BRIEF DESCRIPTION OF THE DRAWINGS

FIG. 14 is a chart representing a buyer's possible actions in response to an event depending on the status of the event;

FIG. 15 is a chart representing a seller's possible actions in response to an event depending on the status of the event.

DETAILED DESCRIPTION OF THE PREFERRED EMBODIMENT

Figure 1:
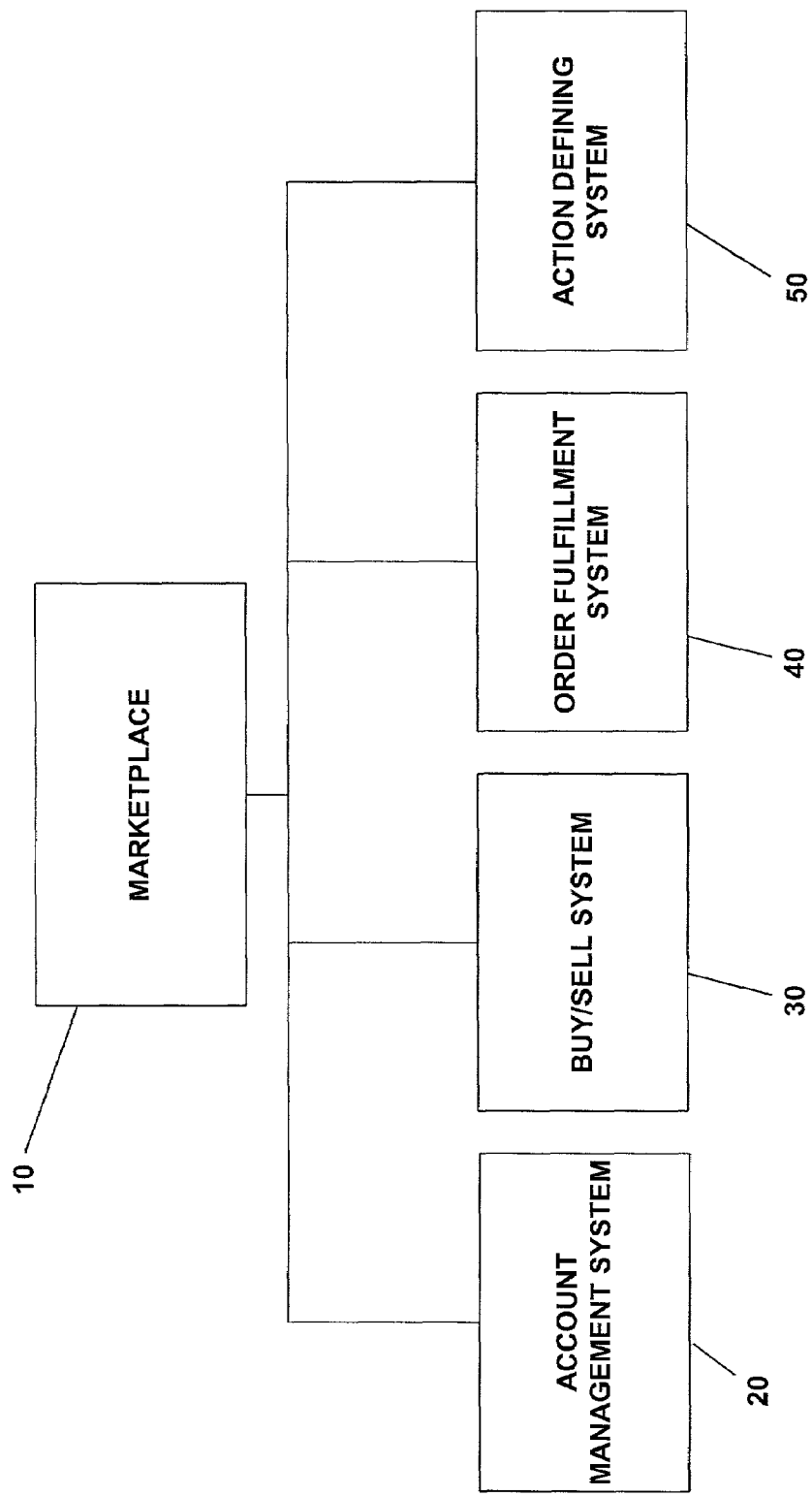
FIG. 1 is an organizational chart of an embodiment of the Marketplace.

The purpose and advantages of the present invention will be set forth in and apparent from the description that follows, as well as will be learned by practice of the invention. Additional advantages of the invention will be realized and attained by the embodiments particularly pointed out in the written description and claims hereof, as well as from the appended drawings. It will be obvious to one skilled in the art that other configurations are possible.

The drawings and the following description, including headings, are for the purpose of illustration and example and not for the purpose of limitation. Reference will now be made in detail to the present preferred embodiments of the invention, examples of which are illustrated in the accompanying drawings. The method and corresponding steps of the invention will be described in conjunction with the detailed description of the system.

The marketplace generally operates over a network, wherein a network generally comprises a net-like combination or pattern in which different elements are joined, including, but not limited to, groups of interconnected computers and the hardware and software used to connect them, such as, internet, phone, LAN, and wireless systems. In one embodiment, the marketplace is a software-based system that is implemented over the internet. The architecture of the internet-based embodiment generally includes an application server cluster, a back office system and a user interface portion. The majority of the software that implements the marketplace is stored and run on one or more data processing components that are part of the application server cluster. The back office system includes at least one database for storing information relating to the marketplace and back office systems such as invoicing and customer support and provides links to third party servers.

The user interface portion provides the software interface that allows communication among and access to users and their systems and the marketplace. Additionally, it provides a fire wall for security purposes. The user interface portion not only facilitates communication among users, their systems and the marketplace, but allows users and their systems to access the marketplace and the marketplace to access the user's systems. In other words, the user interface portion provides integration among users, user's systems and the marketplace.

The marketplace facilitates varying levels of integration among itself, the users and their systems. In general, it facilitates manual interaction, 1-way interaction, 1-way interaction with process enrichment and 2-way interaction. Manual interaction basically involves a user or the marketplace transmitting information to the other (the "receiving party") over a network, on a storage medium or even in printed form. The receiving party then manually enters the information into its computer system. 1-way interaction involves the user's computer system or the marketplace's computer system sending information directly to the other party's computer system. In 1-way interaction with process enrichment, the user's computer system or the marketplace's computer system sending information directly to the computer system of the other party which triggers the other party's computer system to take a predetermined action. In 2-way interaction, both the user's computer system and the marketplace's computer system can send information directly to each other either when prompted by the user (in the case of the user's system) or an individual associated with the marketplace (in the case of the marketplace, or when prompted by the other party's computer system. For example, the marketplace may prompt the user's system for information and the user's system will automatically respond and vice versa. These varying levels of interaction are used by the marketplace to provide the user interface needed by each of the marketplace's systems and subsystems.

It will be obvious to one skilled in the art that there are many possible architectural configurations for the present invention. The foregoing configuration is presented for illustrative purposes and not for the purpose of limitation.

FIG. 1 shows an organizational chart of an embodiment of the marketplace 10. In this embodiment, the marketplace is a comprehensive system that acts as an intermediary and facilitator among buyers and sellers of freight transportation services that enables the sale and purchase of freight transportation services and provides the related support services. The marketplace operates in real-time and across multiple transportation modes and generally operates over a network. The marketplace 10 generally includes the following major subsystems: an account management system 20, a buy/sell system 30, an order fulfillment system 40 and a action defining system 50.

Account Management System 20.

Figure 2:
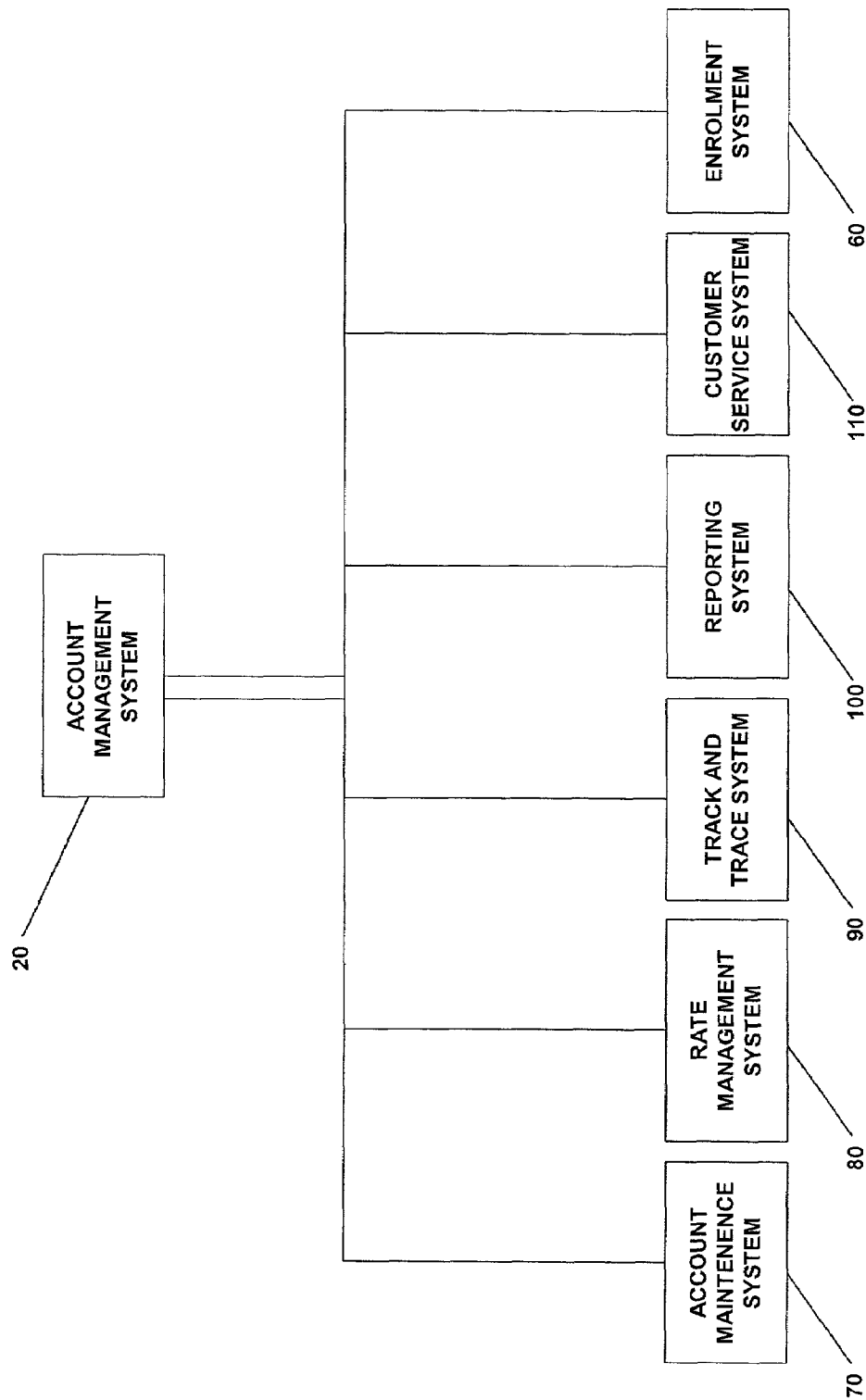
FIG. 2 is an organizational chart of an embodiment of the Account Management System.

An embodiment of the account management system is shown in FIG. 2. The account management system 20 manages all aspects of the customer accounts and generally comprises an account maintenance system 70, a rate management system 80, and a track and trace system 90. The account management system 20, may also include a reporting system 100, a customer service system 110, and an enrollment system 60.

Figure 3:
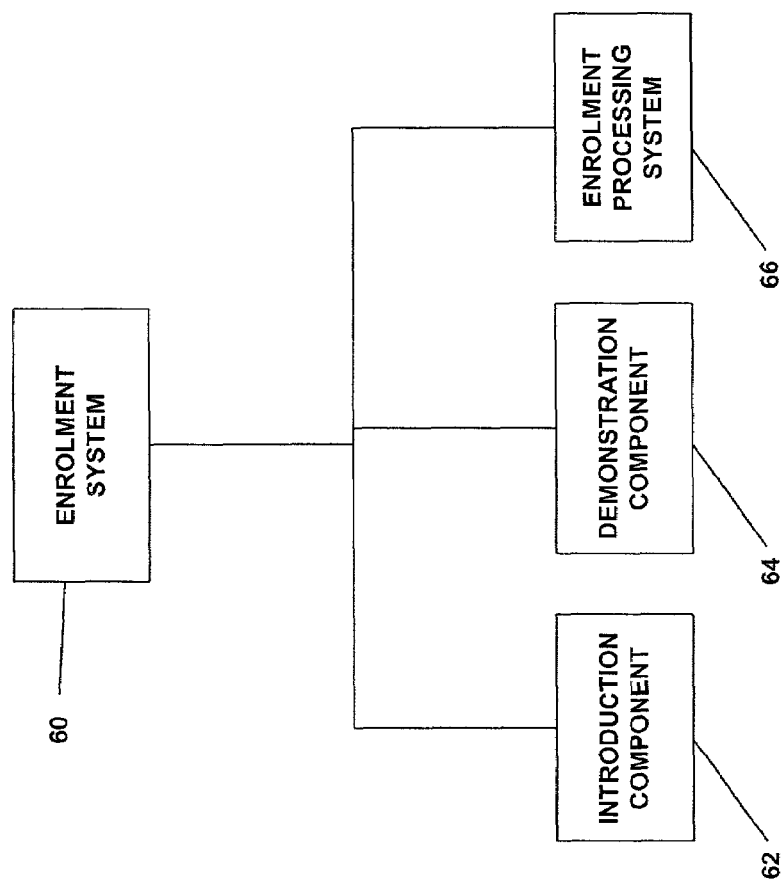
FIG. 3 is an organizational chart of an embodiment of the Enrollment System.

The enrollment system 60, shown in FIG. 3, is the system by which potential customers are enticed to enroll and are enrolled in the marketplace. Enrollment is the process by which potential customers become customers and are granted access to the marketplace. The enrollment system 60 comprises an introduction component 62, a demonstration component 64 and an enrollment processing system 66. The introduction and demonstration components are used to entice potential customers to enroll with the marketplace while the enrollment processing system performs the actual enrollment. The introduction component 62 is the system that gives potential customers an overview of the features and benefits of the marketplace. The demonstration component 64 is a system that gives potential customers a demonstration of the marketplace's features and operation. The enrollment processing system 66 evaluates and enrolls potential customers and may also be used to identify potential customers.

Potential customers that are enrolled become customers and gain access to the marketplace. In order to be enrolled, potential customers must demonstrate that they meet the criteria set forth by the marketplace. These criteria may include, meeting the business model of the marketplace, having the necessary financial resources, insurance, operating authority and/or seller's rules tariffs, being willing to accept the marketplace's membership agreement or any other criteria. Potential customers are enrolled in the system by providing answers to questions generated by the enrollment system. The potential customers may input the information into the marketplace themselves over the network or provide the answers to others who will input the information into the marketplace. If the enrollment is successful, the potential customer becomes a customer for whom a customer account (may also be referred to simply as "account") is established.

Figure 4:
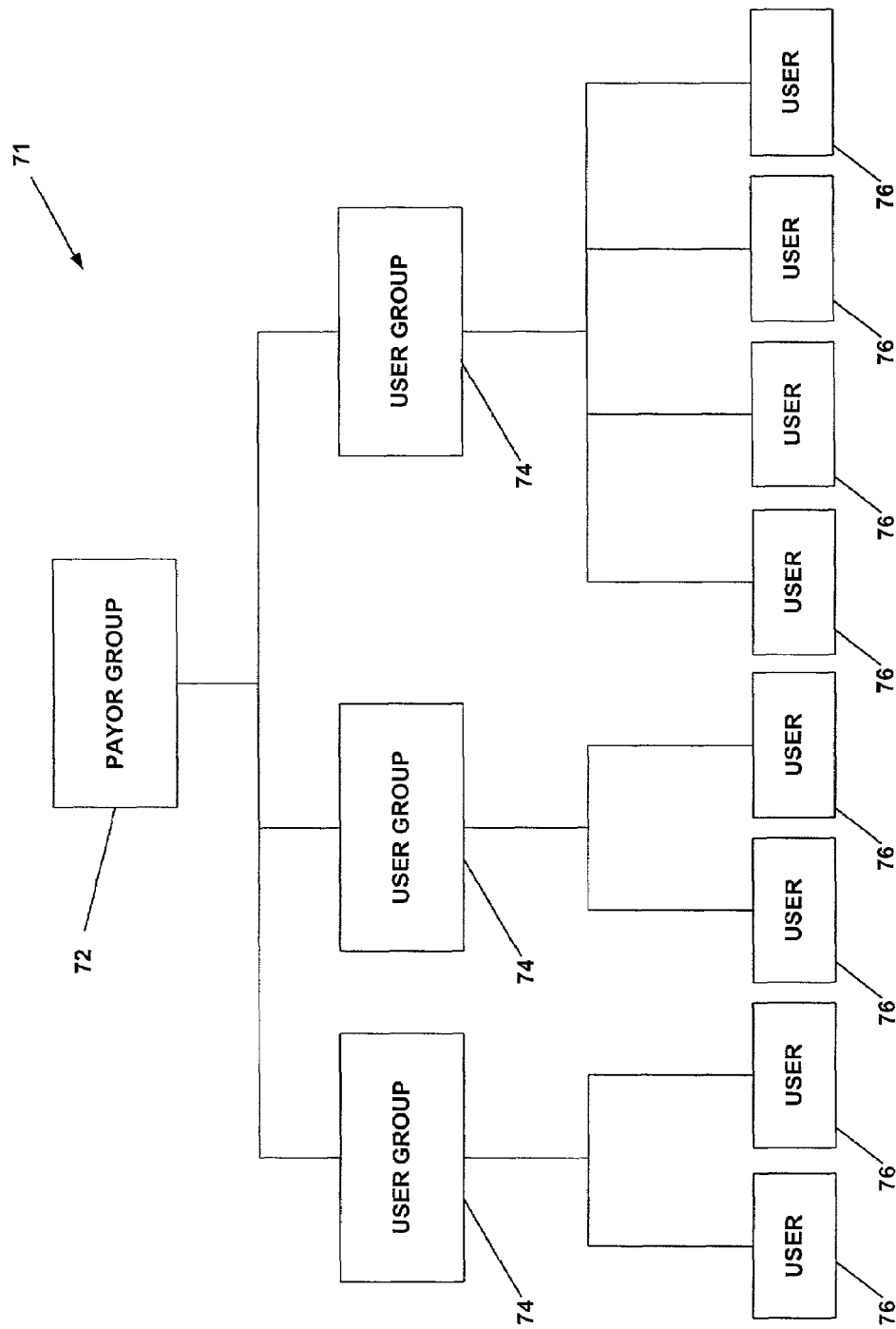
FIG. 4 is an organizational chart of an embodiment of the Hierarchical Account Structure.

Once customers are enrolled and gain access to the marketplace, the account maintenance system establishes and structures accounts for the customers. The account maintenance system 70, shown in FIG. 2, is the system by which accounts are established and structured. Accounts are the mechanism that allows customers to access and utilize the marketplace. In one embodiment, the account maintenance system 70, is structured is by a hierarchical account structure 71, which is shown in FIG. 4. The hierarchical account structure 71 structures accounts in such a way as to provide organization and security. The hierarchical account structure 71 generally includes three levels, the payor group level, the user group level, and the user level.

The payor group level, is the highest level in the hierarchical account structure 71 and it contains at least one payor group 72. A payor group 72 generally comprises a single customer who may be an individual, company or other organization. However, the payor group may also comprise a division, or other subset of a customer. Additionally, a customer may have more than one payor group. In the payor group level, user groups are defined. The user group level, is the intermediary level of the hierarchical account structure 71 and contains at least one user group 74. Each user group 74 may define an account from which and/or to which payments may be made ("a payment account") that can be used by all members of that user group 74. The user groups 74 allow the customer to establish multiple methods of payment by establishing multiple payment accounts each to which a different method of payment is assigned, or to divide its payments among several payment accounts by establishing multiple payment accounts. A payor group 72 may have many user groups 74, but a user group 74 may belong to only one payor group 72.

The lowest level in the hierarchical account structure is the user level. The user level defines the users 76 of the marketplace. Users 76 are generally individuals. Every user 76 within a payor group 72 will generally be an employee, agent or other representative of the same customer. If a customer is an individual, the user and the customer are one and the same. The user groups 74 each have at least one user 76 and each user 76 may belong to more than one user group 74.

The hierarchical account structure 71 provides organization and/or security for customers by assigning roles at the user, user group and payor group levels. Each user, user group and/or payor group may be assigned one or more than one role. A role, whether assigned at the payor group, user group or user level, or at more than one of these levels, determines the scope and privileges of the user or users within the group to which the use is assigned. Each role has a scope and at least one privilege with which it is associated. The hierarchical account structure 71 provides data level security through the scope and functional level security through the privileges. Additionally, the hierarchical account structure may also provide security through authentication by requiring each user to enter an identification number and a password in order to gain access to the marketplace 10.

When assigned at the payor group level, the roles define the possible roles that may be assigned to the user groups and/or users within that payor group. Similarly, when assigned at the user group level, the roles define the possible roles that may be assigned to the users within that user group. When assigned at the user level, the role determines the scope and privileges assigned to that user. The roles generally include buyer, seller, rate administrator, rate contact, tender contact, accounting contact and account administrator, although others are possible.

The scope associated with a role defines the level of information that may be viewed and/or transacted upon by a user. This provides data level security by allowing a customer to dictate which of its users have access to what information. Each role is generally assigned a different scope. For example, the scope for the buyer and seller roles may be defined as the user group level, while the scope for the account administrator may be defined as the payor group level. This means that buyers and sellers may only view information that is related to the user group to which they are a member, while the account administrator may view all the information for the entire payor group which may contain several user groups. However, these differing scopes may provide access to overlapping information. Therefore, buyers and seller have access to some of the same information. In order to provide additional security, if users within a payor group have been assigned both buyer and seller roles, regardless of at what level the assignment was made, those users may not view both sides of the same transaction. A transaction may be a buyer's auction, seller's auction or catalog rate. For example, if a user assigned the role of seller establishes an auction, no other user in that payor group may view the buyer's information for that auction, even if such a user has been assigned the role of buyer.

The privileges associated with a role define the operations or actions that the user may perform. This provides functional security by allowing customers to dictate the actions that each user in its payor group may perform. In one embodiment, the privileges associated with the buyer role generally allow the user to only perform the actions associated with purchasing freight transportation services such as placing, retracting, modifying and canceling, orders, auctions, bids and queries. The privileges associated with the seller role generally allow the user to only perform the actions associated with selling freight transportation services such as posting catalog rates, accepting orders, placing, retracting, modifying and canceling, auctions, bids and queries. The privileges associated with the account administrator role generally allow the user to perform such actions as enrolling the customer, maintaining account information and adding or eliminating users.

Additionally, the marketplace 10 may support roles that are assigned to the marketplace 10 itself. Such roles may include auditor, customer service representative, rate administrator and administrator. An auditor monitors the activities within the payor groups. Therefore, the auditor role would have a scope that enables the auditor to view all information associated with every payor group and would be assigned a privilege that only allows viewing the information. Customer service representatives would be given a scope that allows them to view the information at the user level and be given privileges that allow them to solve a predetermined set of user problems. Rate administrators would be given a scope that would allow them to view the rate information at the user group or payor group level and would be given privileges that allow them to maintain rates for customers who do not wish to do so themselves. An administrator would be given the most expansive view and privileges at all levels, so that he or she can maintain the entire marketplace 10 and deal with all issues that may arise in connection with it. Those skilled in the art will appreciate the multitude of possible roles, views, privileges and combinations thereof, of which the foregoing gives only a few examples.

The account maintenance system may also include profiles. When customers and their users are enrolled in the marketplace 10, or at some later time after enrollment, the marketplace 10 creates profiles that may be updated regularly. These profiles include, user profiles, seller profiles, buyer profiles and location profiles. A user profile is created for each user and contains basic information about that user such as, name, address, phone number, e-mail address and the like. Each user may update his or her profile at any time. Additionally, the marketplace and other users, such as an account administrator may have the privilege to update the user profile. User profiles are maintained at the payor group level and therefore may only be viewed by other users in the same payor group. Seller and buyer profiles are also maintained at the payor group level.

Seller and buyer profiles are created for users assigned the seller or buyer roles, respectively. These profiles are maintained by the marketplace. They both include information such as, basic information about the user, information regarding the number of transactions the user has consummated, restrictions (users with whom they do not wish to transact) and feedback from other users. The seller's profile may also include information regarding the seller's service reliability and the seller's rules tariffs. Seller's rules tariffs detail a seller's general provisions relating to the provision of freight services. These provisions include, but are not limited to, the seller's governing regulations on providing freight services (which may refer to governmental regulations or industry standards), rates, accessorial fees and the process for processing claims (such as claims against the seller for damages to freight). Information regarding pickup and delivery locations may be stored in a location profile which is used by the marketplace to pre-populate the fields of a freight order or capacity order. This information includes not only the address but information regarding the features of the location such as, accessibility of the docks and other such information.

The location profile is generally entered and maintained by the account administrator. A payor group may have more than one location profile and the users within that payor group may associate any freight order or capacity order they create with whichever of the location profiles the user chooses.

Figure 5:
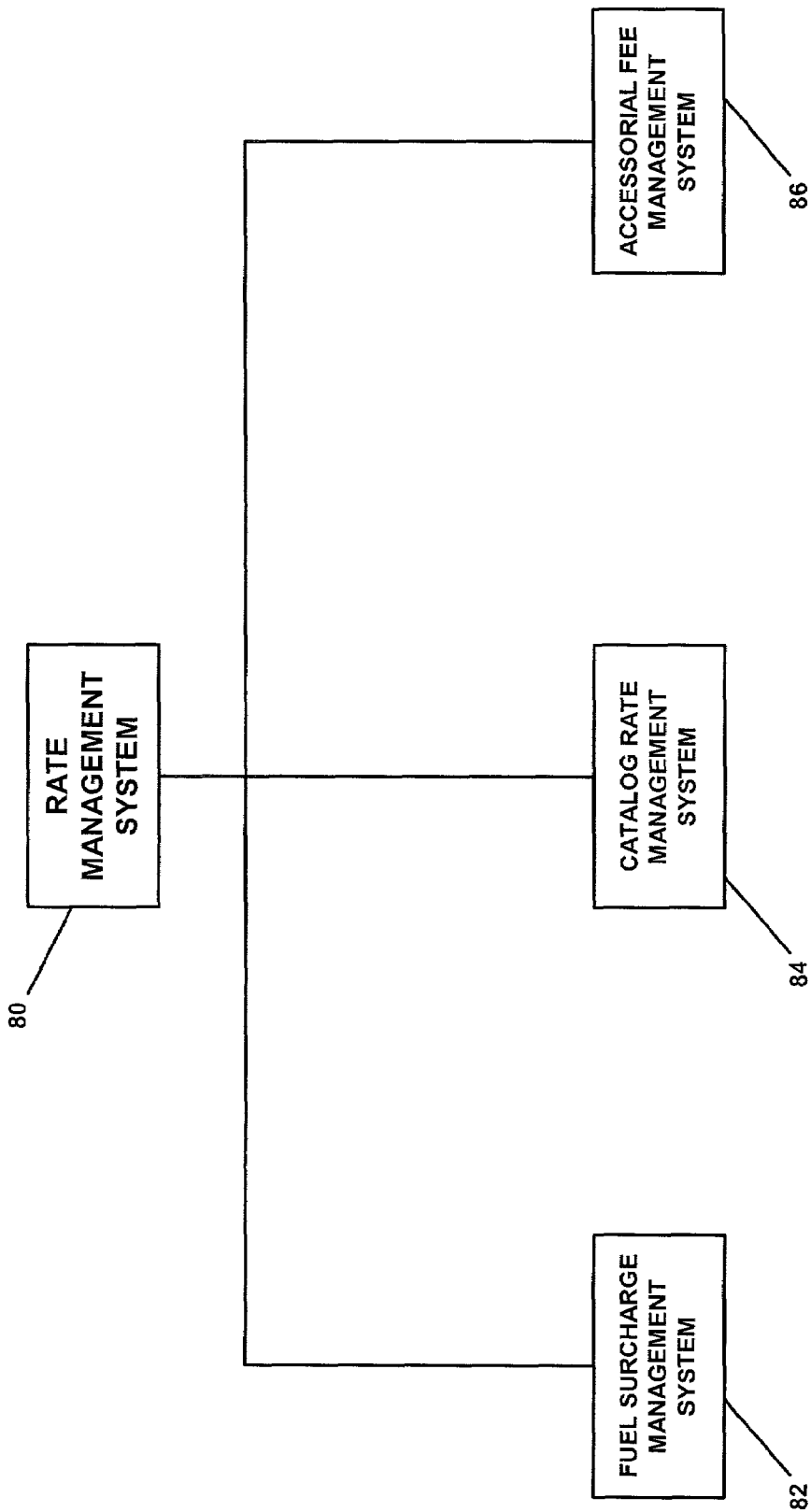
FIG. 5 is an organizational chart of an embodiment of the Rate Management System.

Another subsystem of the account management system 20 is the rate management system 80, shown in FIG. 5, which allows sellers to manage the fees they charge for providing freight transportation services. Sellers offer freight transportation services in terms of the amount of freight the seller can transport (the "capacity"). The capacity may be indicated in a volume measurement, number of truckloads, rail cars or any other way of indicating capacity. The rates sellers charge are generally for a given capacity. The rate management system 80 enables sellers to easily and efficiently change and/or capture various rates, charges, fees and capacity for the freight transportation services they provide. Additionally, the rate management system 80 allows sellers to inform the marketplace that they are willing to be part of marketplace created freight transportation services. In one embodiment, sellers indicate this willingness simply by providing the marketplace with certain types of rates, such as, drayage or rail rates. In one embodiment, the rate management system includes systems for managing fuel surcharges (a "fuel surcharge management system" 82), catalog rates ("a catalog rate management system" 84) and accessorial fees (an "accessorial fee management system" 86).

The catalog rate management system 84 enables sellers to sell freight transportation services from catalog rates. The catalog rates may be made available on a per mile, flat rate or other basis. Catalog rates are the fees for freight transportation services that are generally available, and are sometimes referred to as "published rates." Although catalog rates are generally available to all users, a seller may designate some catalog rates as "private rates." These private rates are catalog rates that are only available to and may only be viewed by a subset of users, user groups or payor groups as specified by the seller. One way a seller may change catalog rates over time is by giving different rates different effective dates. Additionally, rates can be made available for discrete periods of time by defining effective dates. The rates will only be available during the effective dates assigned to them.

The rate management system may also include a fuel surcharge management system 82. The fuel surcharge management system 82 enables a seller to set and update fuel surcharges. Fuel surcharges are fees imposed on a buyer for the cost of fuel used in providing freight transportation services. The general purpose of the fuel surcharge is to compensate the seller for any increase in fuel costs over those assumed when the rates were made available to the marketplace. The fuel surcharge is generally managed at the payor group level. The fuel surcharge can be set as a flat per mile rate or as a percentage of the actual freight charge (the actual charge to the buyer not including fuel surcharges or accessorial fees). Alternatively, a seller can apply the fuel surcharges only to catalog rates. The fuel surcharges can vary with time by giving each fuel surcharge a different effective date. The seller role generally give the seller the following privileges: update, delete, add and modify the fuel surcharges. Managing the fuel surcharges gives sellers an additional or alternative way to manage their overall rates and rate structure.

The accessorial fee management system 86, is the system by which sellers manage their accessorial fees. Accessorial fees are miscellaneous fees incurred by the seller when providing freight transportation services. These fees may include demurrage fees (fees for exceeding the free time allowed under the terms of railroad and ocean tariffs for unloading and/or loading freight), storage charges, stop-off charges (fees for a load that must be picked up from or dropped off to more than one location), detention fees (fees for exceeding the free time allowed under the terms of the tariffs relevant to the motor carriage industry for loading and/or unloading freight), and lumper fees (fees paid to occasional workers for loading and/or unloading freight).

Figure 6:
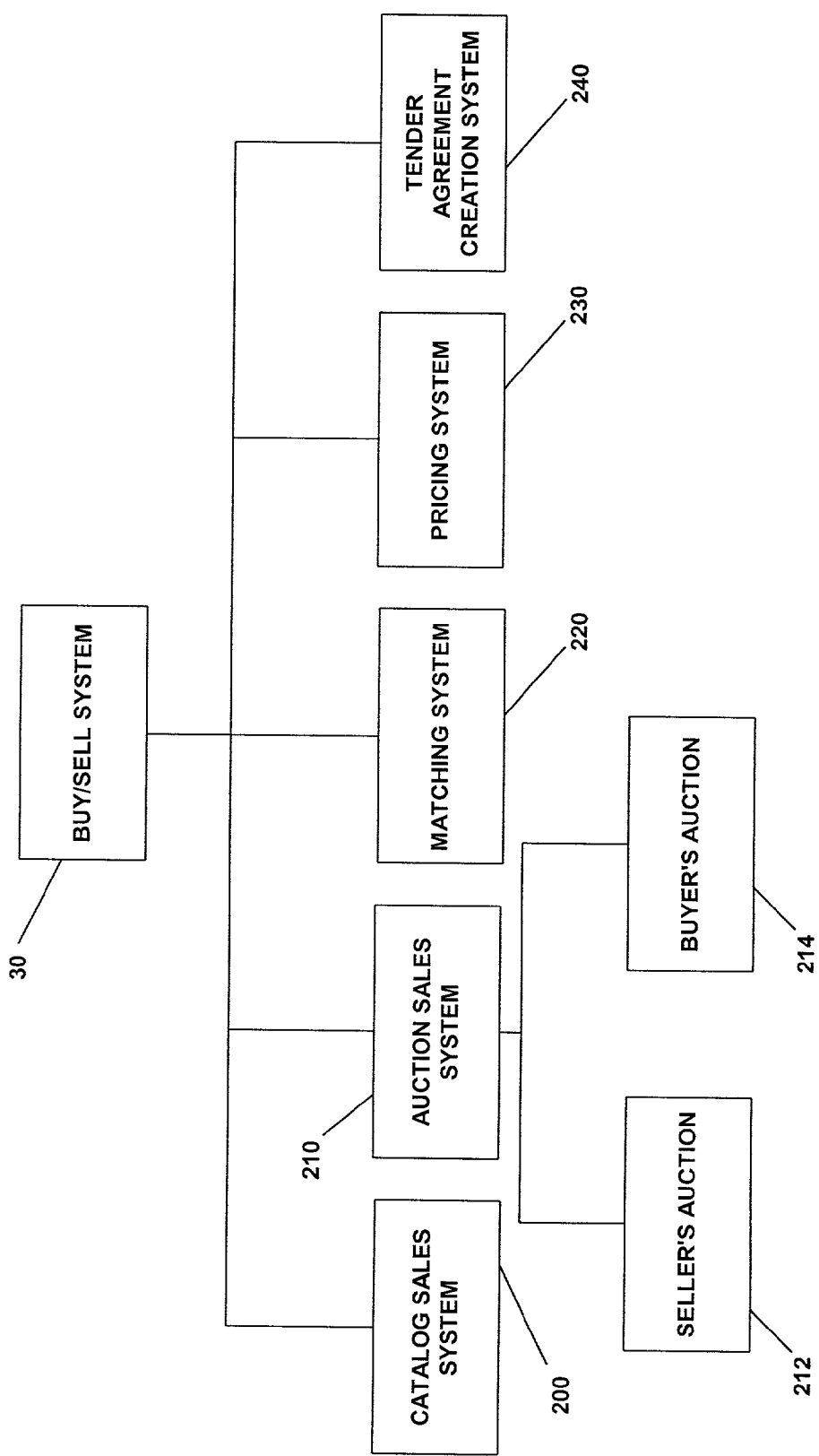
FIG. 6 is an organizational chart of an embodiment of the Buy/Sell System.
Figure 11:
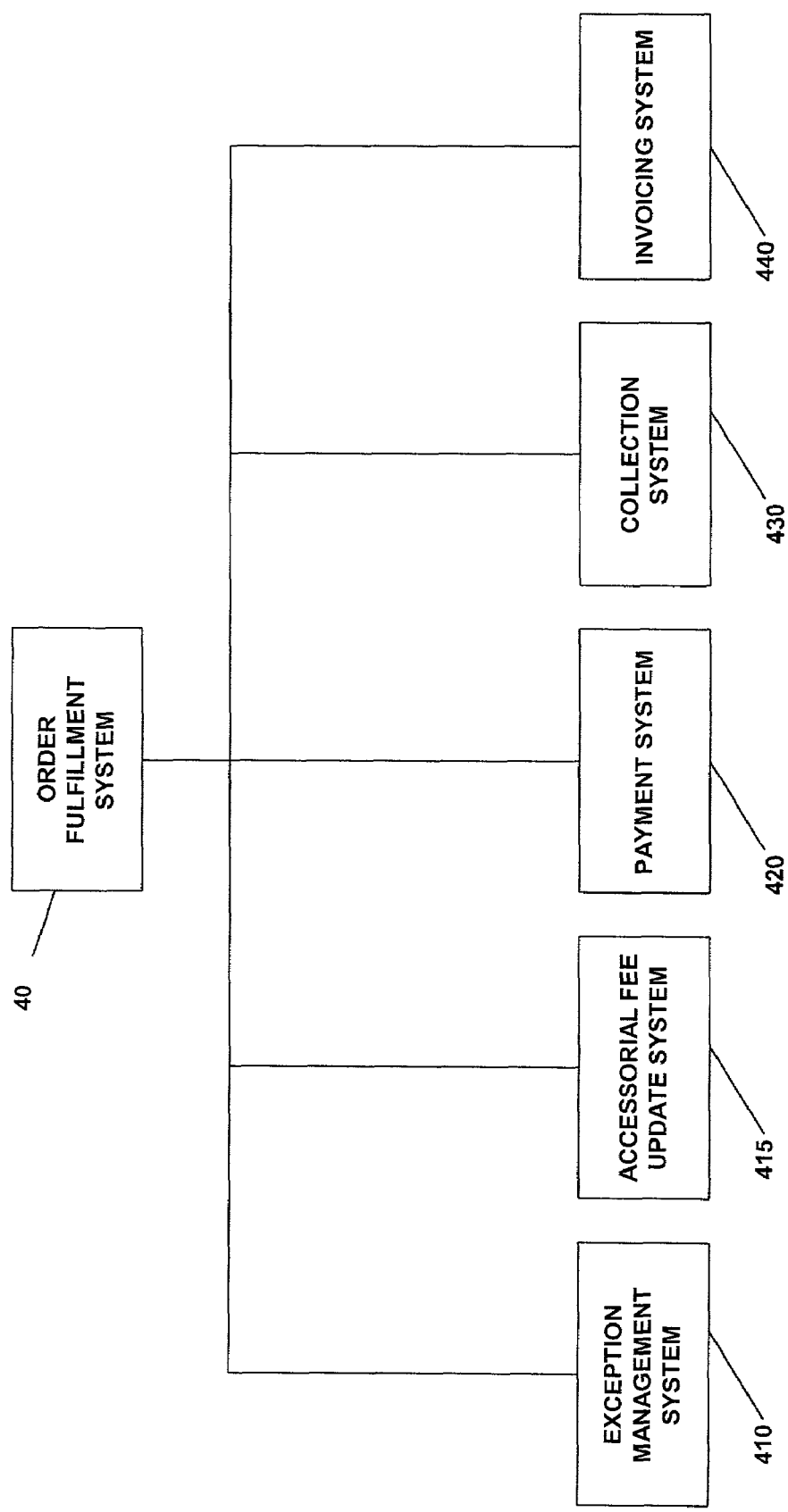
FIG. 11 is an organization chart of an embodiment of the Order Fulfillment System.

The marketplace 10 enables several different ways that a seller may deal with accessorial fees, such as, (1) through the account management system, shown in FIG. 2, (2) through the tender agreement creation system 240, shown in FIG. 6, and (3) through the accessorial fee update system, shown in FIG. 11. The account management system and the tender agreement creation system allow sellers to establish and update accessorial fees. However, it is difficult to anticipate all the possible instances where accessorial fees will arise. Therefore, the marketplace 10 includes an accessorial fee update system that enables the seller to recover accessorial fees not otherwise provided for.

The user interface provided by the marketplace 10 for the rate management system 80 includes manual interaction and/or 1-way interaction with process enrichment. Using manual interaction, the seller's rates, capacity and related information (such as effective dates, expiration dates, private rates) are made available to users basically by the seller providing the rates, capacity and related information to the marketplace 10, the marketplace 10 entering the information into the rate management system and making the information available to the seller who then reviews and approves the rates. The seller may provide this information to the marketplace 10 over a network. When the marketplace receives the information, the information must then be entered into the marketplace's computer system. The seller may provide this information in a variety of formats compatible with the marketplace, including, but not limited to, flat file and XLS. The seller may update the rates, capacity and related information in a similar manner.

Using 1-way interaction with process enrichment the seller's rates, capacity and related information are made available to users basically by the seller prompting the seller's computer system to send the information directly to the marketplace's computer system, where it is automatically implemented in the rate management system. The user's computer system can send the information in any format compatible with the marketplace, including, but not limited to flat file, XLS, EDI and XML. The seller can update this information at any time using the same method.

Another aspect of the account management system 20 is the track and trace system 90. The track and trace system 90, is the mechanism used by the marketplace for (1) tracking the life cycle of auctions, orders and tender agreements, and (2) triggering certain occurrences. The track and trace system 90 provides an event trail and/or history log which is accessible to users. However, the extent of a user's access to the history log depends in part on that user's role. Additionally, the track and trace system triggers occurrences in other systems in the marketplace. These occurrences may include sending messages to users and/or triggering the automated payment and distribution system.

The track and trace system operates by archiving track and trace events. Track and trace events are predetermined user actions or other events for which the marketplace maintains records and defines as track and trace events. Track and trace events may be created automatically by the marketplace in response to the occurrence of predetermined actions or events associated with an order, auction, query or notice. Thus, when one of the predetermined events or actions occurs, the marketplace recognizes the occurrence and stores information relating to the occurrence in the history log. Information such as, the date and time of the occurrence, the action or event that occurred and any other relevant information as determined by the marketplace may be included.

In one embodiment of the present invention, track and trace events are created when orders, catalog rates or auctions are created or updated, when the status of an order, catalog rate or auction changes, when comments are added to a tender agreement after the tender agreement was consummated and upon receipt of the following messages from a seller: advanced shipment notification, shipment status update and proof of delivery. In this embodiment, a track and trace event is created when the seller notifies the marketplace that a shipment has left the loading dock (an "advance shipment notification" or "ASN") and when the seller notifies the marketplace that the shipment has reached its destination ("proof of delivery" or "POD"). Upon receipt of the POD, the automated payment and distribution system is triggered to remove the buyer's price from the buyer's payment account after a predetermined time period has past after the occurrence of the POD track and trace event. The seller's price is moved into the seller's payment account after another predetermined time period has past after the occurrence of the POD track and trace account. The predetermined time period after which funds are removed from the buyer's payment account is established by the buyer in the buyer's profile (such as two (2) days after POD) and for which the buyer may be charged a payment option fee by the marketplace. The second predetermined time period after which the funds are moved into the seller's account may be a time established by the marketplace (such as thirty (30) days after POD), or, alternatively, may be established by the seller in the seller's profile. In another embodiment, the ASN track and trace event may be used to trigger the automated payment and distribution system.

Track and trace events may also be used by the marketplace to trigger the sending of messages to users. For example, if while providing freight transportation services, the seller encounters a delay, the seller may then notify the marketplace (a "shipment status update" or "SSU"). This SSU creates a track and trace event that triggers a message to be sent to the buyer notifying the buyer of the delay. Additionally, the marketplace will be triggered to send messages to the appropriate users whenever an auction, order or catalog rate changes status.

Track and trace events may also be used to facilitate messaging among sellers involved in providing multi-leg freight transportation services. The seller providing the services for the first leg communicates an ASN to the marketplace. This communication creates a track and trace event that triggers messages containing the ASN information to be sent to the other sellers involved in providing the services and, in some cases, the buyer. Each subsequent seller communicates the state of the shipment to the marketplace. These communications also create a track and trace events which trigger messages to be sent to the other sellers and, in some cases, to the buyer. Almost any occurrence or event may be established as a track and trace event and configured to send messages or trigger other occurrences.

The user interface portion of the marketplace can use the following levels of integration to facilitate the track and trace system: manual interaction, 1-way interaction and 1-way interaction with process enrichment. Manual integration may be used to enable users to communicate with the marketplace. This communication may be accomplished over a network, such as through a web user interface. Using 1-way interaction, users can communicate to the marketplace by prompting their computer systems to send messages to the marketplace's computer system. The messages can be in any format compatible with the marketplace and the network and the formats include, but are not limited to EDI. Using the 1-way interaction with process enrichment, users can communicate to the marketplace by prompting their computer systems to send messages to the marketplace's computer system whereupon the marketplace automatically takes an action, such as, sending a message to another user. This allows users to not only communicate with the marketplace but with each other.

Another aspect of the account management system 20 is the reporting system 100. The reporting system 100 essentially generates reports for users. Reports can be generated that summarize the operations, tender agreements, rates and any other aspect of an account. For example, sellers can use the reporting system 100 to generate reports that summarize and rank the buyers in terms of the number of times the buyers have purchased the seller's freight transportation services, the catalog rates over a given time period, the orders that have been placed in response to their auctions and catalog rates, and any number of reports and types of reports may be generated for any data that is recorded regarding or related to the seller's activities within the marketplace. Similar reports are also available to buyers. The ability of a user to generate a given report or type of report may also be limited by the scope associated with the roles assigned to that user. Therefore, users only have access to the reports that are included in the scope associated with that user's role.

Still another aspect of the account management system 20 is the customer service system 110. The customer service system 110 enables the marketplace to log, resolve and assist in resolving any issues, questions or problems encountered by users or customers and to train users and customers in the use of the marketplace. Preferably, the customer service system is available to users and customers on a 24/7/365 basis. The customer service system 110 may take the form of a communication with the marketplace via a network and may be provided by people, electronically or any other means.

Buy/Sell System.

Another major subsystem of the marketplace 10 is the buy/sell system 30, which is shown in FIG. 6. The buy/sell system 10 is the system that facilitates buyers purchasing and sellers selling freight transportation services through the creation of tender agreements. The buy/sell system 10 enables the sale of freight transportation services through catalog rates via a "catalog sales system" 200 and through auctions via an "auction sales system" 210 which includes both "seller's auctions" 212 and "buyer's auctions" 214. A matching system 220, enables users to find catalog rates and auctions of interest by entering queries into the marketplace that indicate the criteria desired by the user. Once a user has located a catalog rate or auction of interest and responded to it (placed an "order"), the tender agreement creation system 240 creates a tender agreement. The tender agreement is not only the primary means through which the buyer and seller communicate, but becomes a binding agreement between buyer and seller that specifies the terms under which the freight transportation services will be provided. The price for the freight transportation services is generated by a pricing system 230 that generates a price using the seller's charges and the marketplace fees. The price is generally incorporated into the tender agreement.

In both the catalog sales system 200 and the auction sales system 210, sellers may sell and buyers may purchase both single-leg and multi-leg (including multi-modal) freight transportation services. Multi-leg freight transportation services are freight transportation services that involve more than one trip or leg. At a minimum, they consist of a trip between the location from where the freight is to be picked up (as agreed to in the tender agreement) and an intermediary location, and the intermediary location and the ultimate destination of the freight (as agreed to in the tender agreement). However, multi-leg freight transportation services may involve trips to several intermediary locations. Generally, multi-leg freight transportation services are provided by a plurality of sellers (at least two) each providing the freight transportation services for a single leg. However, a seller may provide the freight transportation services for more than one leg. Multi-modal freight transportation services are multi-leg freight transportation services wherein the freight transportation service is provided using at least two modes of transportation that include, rail, trucks, ocean, air, parcel, rail carload, less-than-truckload, and any other method or means of moving goods.

Multi-leg freight transportation services, are generally provided by a plurality of sellers However, the buy/sell system enables a buyer to effectively transact with only one seller. The plurality of sellers providing the multi-leg freight transportation services will generally include a seller that is an accepting party and a seller that is an equipment party. However, the accepting party and the equipment party may be the same seller. The accepting party is the seller that is responsible to the marketplace and the buyer for the freight transportation service offered. The accepting party generally has authority to bind the other sellers and make certain decisions on their behalf. The accepting party is often the seller that is responsible for the first leg of the multi-leg freight transportation services, but may be any of the sellers involved in providing the multi-leg freight transportation services. A buyer that purchases multi-leg freight transportation services, deals with the accepting party in the same way that a buyer would transact with a seller providing single-leg freight transportation services. The equipment party is the seller who owns or controls the equipment, such as a trailer, container, train car, etc., which will travel with the freight throughout the provision of the freight transportation services. This equipment party makes the equipment available to the other sellers involved in providing the multi-leg freight transportation services. This allows the same piece of equipment to move with and the freight, thus eliminating the need to unload or unpack and reload or repack the freight. The equipment party is often the seller providing one of the middle legs of the freight transportation services, but may be any of the sellers.

There are two ways in which the buy/sell system facilitates the provision of multi-leg transportation services. The first way is for a group of sellers to agree amongst themselves to provide the multi-leg freight transportation services together ("seller-created multi-leg freight transportation services") and the terms under which they will provide the service. The second is for the marketplace to create multi-leg freight transportation services ("marketplace-created multi-leg freight transportation services") from among sellers who have indicated that they are willing to provide part of such services ("willing sellers").

The buy/sell system allows a group of sellers who have agreed amongst themselves to provide seller-created multi-leg freight transportation services, to offer such seller-created multi-leg freight transportation services in the marketplace. Such a group of sellers will agree amongst themselves which seller is to be the accepting party, which is to be the equipment party and the exact services and/or equipment each seller will provide. The accepting party will then interact with the marketplace and buyers with regard to the services the group of sellers has agreed to offer collectively. This means that it is the accepting party who is responsible for supplying the catalog rate or auction information for the entire multi-leg freight transportation service (the aggregate of the services provided and rates charged by each seller) to the marketplace and is ultimately responsible to the buyer for the services.

Additionally, the marketplace itself can create multi-leg transportation services by combining the services of at least two willing sellers. Sellers who wish to be willing sellers indicate to the marketplace that they are so willing and the services they are willing to perform and the rate at which they are willing to perform them through the seller's profile in the rate management system by supplying certain types of rates, such as rail or drayage. When a buyer enters a query, the buy/sell system will (in addition to searching for any other matches) create marketplace-created multi-leg freight transportation services that match the criteria set forth in the buyer's query by combining the services of at least two willing sellers. Once the marketplace has created the marketplace-created multi-leg freight transportation services, as a default, it appoints the seller who will provide the services for the first leg the accepting party and the seller that has the necessary equipment the equipment party. However, the equipment party then the power to appoint any seller, including itself, involved in the marketplace-created multi-leg freight transportation services as the accepting party.

The user interface portion uses the 2-way interaction level of interaction among the users, their systems and the marketplace to enable marketplace-created multi-leg freight transportation services. When the marketplace attempts to create marketplace-crated multi-leg freight transportation services in response to a query, the marketplace's computer system will communicate with the computer systems of the willing sellers and asks these computer systems to provide the sellers' current equipment availability. Additionally, if the marketplace does create a marketplace-created freight transportation service that is purchased, the marketplace's computer system will communicate this information to the computer systems of the sellers involved. Furthermore, the sellers' computer systems can communicate any new or updated information regarding rates, capacity and equipment availability directly to the marketplace's computer system. The communication between the marketplace's computer system and the sellers' systems can be accomplished over a network using any information format compatible with the network and the marketplace, including, but not limited to, XML.

Users locate auctions and catalog rates of interest by using the matching system 220. The matching system 220, allows users to find freight transportation services or demands for freight transportation services that match criteria of the freight transportation services they desire, or the freight transportation services they have to offer, respectively by finding "matches" in response to queries placed by users (also known as performing "matching"). Buyers seeking freight transportation services place freight queries that include the criteria of the desired freight transportation services. Sellers seeking demand for freight transportation services place demand queries that include the criteria of the freight transportation services the seller has to offer. The matching system searches the catalog rates and auctions within the system and return as matches those catalog rates and auctions that match the criteria set forth in the query, including single-leg ("single-leg matches") and multi-leg and/or multi-modal ("multi-leg matches" and "multi-modal matches," respectively) catalog rates and auctions.

After the matches are presented to the user, the user is then free to make a response to any match (place an "order" or "bid") or make no response at all. If a user chooses to place an order, the user may assign an expiration date to that order with the effect that the order is not valid beyond that expiration date. In some embodiments, if a buyer is placing an order, the buy/sell system will not allow the order to be placed if the buyer does not have sufficient funds in the buyer's payment account. In this case, the buy/sell system determines whether the buyer has sufficient funds in that buyer's payment account to cover the freight transportation services the buyer is attempting to order. If the buyer does not have sufficient funds, the buy/sell system will not permit the buyer to place the order.

Once an order is placed, the marketplace then creates a purchase event (this purchase event can also be a track and trace event). The purchase event triggers the pricing system 230 to create the price for the order and the tender agreement creation system 240 to begin creating a tender agreement. A tender agreement is a binding agreement that governs the terms of tender between a buyer and a seller. The tender agreement generally incorporates the sellers rules tariffs into its terms. Additionally, if the marketplace has any of its own generally applicable rules ("marketplace rules"), these will generally be incorporated into the tender agreement. Once both the buyer and the seller have accepted the tender agreement the agreement is consummated which means it becomes binding.

Within the buy/sell system, users have varying levels of ability to view each other's profiles and the history log associated with orders and tender agreements. The ability of a user to view the profiles and history logs associated with other users depends, in part, on the roles assigned to that user and the scope associated with those roles. A buyer may view a seller profile at any time that seller has freight transportation services offered for sale either as catalog rates, through an auction or as a demand order placed in response to that buyer's auction. Buyers may also view the history log of the orders and auctions the buyer created and the tender agreements to which the buyer is a party Sellers may only view the buyer profiles of buyers that have either submitted a freight order in response to their catalog rates or auctions, or initiated an auction. Seller may view the history log of the orders and auctions that the seller created and the tender agreements to which the seller is a party.

Catalog Sales System. The catalog sales system 200 enables sellers to sell and buyers to purchase freight transportation services through catalog rates. These catalog rates may be loaded into the marketplace through a catalog rate management system or other means that allows the rates to become available to buyers.

Figure 7:
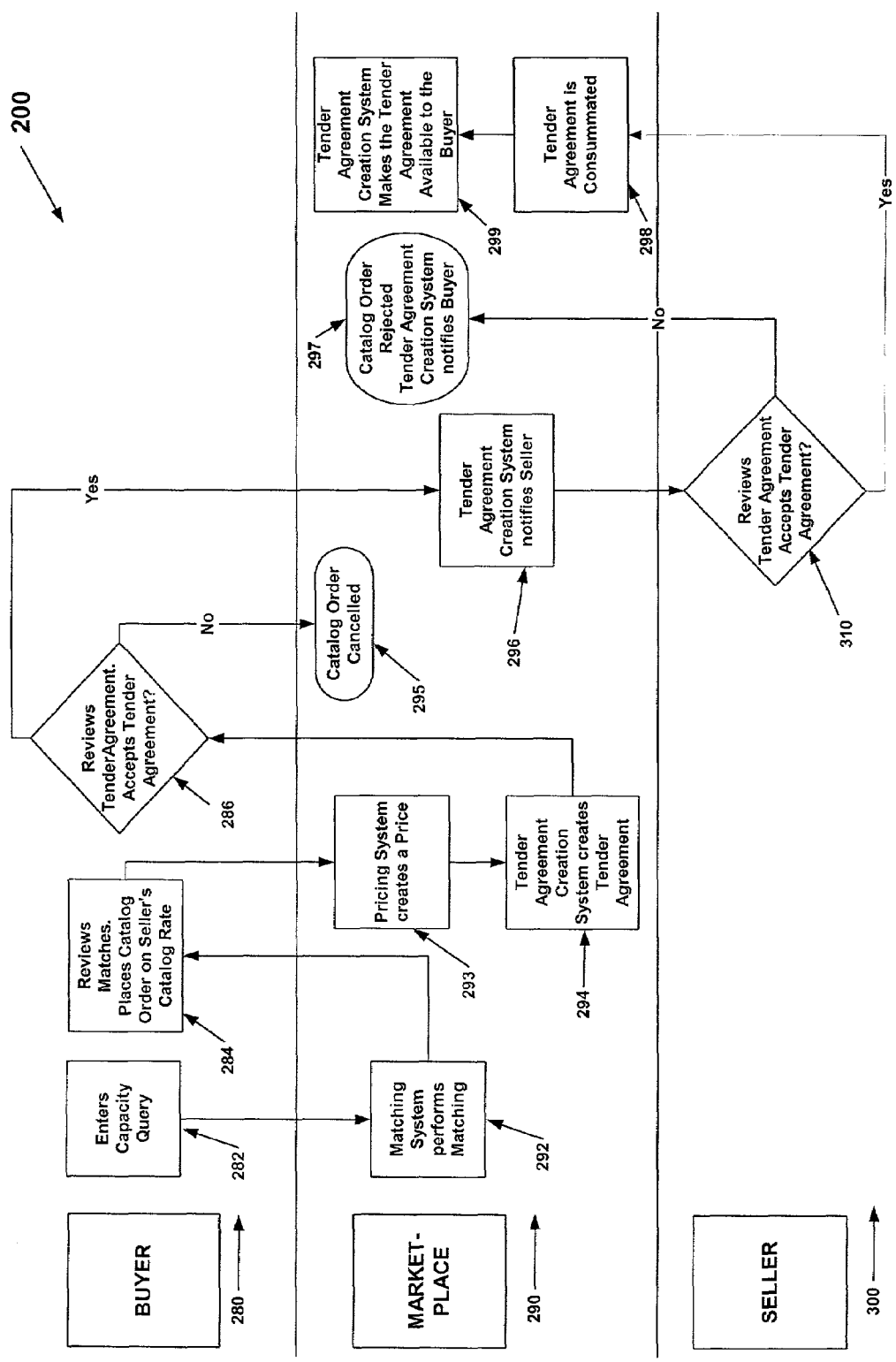
FIG. 7 is a swim-lane representation of an embodiment of the Catalog Sales System.

An example of the operation of an embodiment of the catalog sales system 200 is shown in FIG. 7. The catalog sales system is triggered when a buyer 280 enters a query and then places an order on a catalog rate. A query placed by a buyer 280 is called a capacity query 282. The buyer 280 places a capacity query 282 that triggers the matching system of the marketplace 290 to perform matching 292. Matching is the processes by which both auctions and catalog rates are searched to find the auctions and catalog rates that have characteristics that correspond to those of the query. The auctions and catalog rates found to correspond are "matches." Additionally, if the marketplace 290 contains any private rates or private auctions, the matching system will determine which of the private rates or private auctions, if any, the buyer is entitled to view. Only those private rates and private auctions that the buyer is entitled to view will be returned and deemed matches.

These matches are communicated to the buyer 280. The buyer 280 is free to respond to one or more of the matches or to make no response at all. If the buyer 280 responds to a catalog rate, this is called placing a catalog order 284. If the buyer 280 places the catalog order 284, the pricing system creates the price 293 that will be included in the tender agreement.

The price generated by the pricing system 293 is then used by the tender agreement creation system to create the tender agreement 294 between the buyer and the seller. The tender agreement is then forwarded to the buyer 280 who reviews and has the option of rejecting or accepting the tender agreement 286. If the buyer rejects the tender agreement, the catalog order is cancelled 295. If the buyer 280 accepts the tender agreement, the buy/sell system notifies the seller 300 and forwards the tender agreement 296 to the seller 300. The seller 300 then reviews and has the option of rejecting or accepting the tender agreement 310. If the seller 300 rejects the tender agreement, both the tender agreement and the freight order are rejected and the tender agreement creation system so notifies the buyer 297. If the seller 300 accepts the tender agreement, the agreement is consummated 298 and the tender agreement creation system so notifies the buyer 299.

Auction Sales System. The auction sales system 210 enables both buyers and sellers to auction their need for or ability to provide freight transportation services, respectively. In the auction sales system 200, users make available their need for or their ability to provide freight transportation services in the marketplace as an invitation to other users to make offers with regard to the provision or purchase of needed or available freight transportation services. The users creating the auction are then free to accept any or none of the offers or "orders" or "bids." The auction sales system 210 may also include an accept and continue feature that allows sellers to auction capacity, and buyers to auction demand for capacity, on different pieces of equipment, or different loads, respectively, separately but in a single auction. Additionally, the auction sales system 210 may also include a reject with comments feature. This feature allows communication between buyers and sellers regarding an auction. The reject with comments feature enables users who have created auctions to communicate to users who have placed orders on their auction that they are willing to accept the order but on different terms then presented in the order. The user who placed the order then has the option of revising and resubmitting the order so long as the auction has not expired or otherwise been terminated.

The auction sales system 210 is triggered when a buyer or seller enters an auction into the marketplace or when a buyer or seller enters a query and then decides to place an order on an auction. An auction wherein a buyer auctions a desire for freight transportation services is a "buyer's auction." An auction wherein a seller auctions an ability to provide freight transportation services is a "seller's auction." The privileges assigned to the buyer and seller roles allow only sellers to create seller's auctions and only buyers to create buyer's auctions. This limitation may be implemented through the privileges assigned to the buyer and seller roles or directly in the buy/sell system. Users creating auctions may use information stored in location profiles to provide some of the information and criteria for the auction.

Auctions are generally available to all users of the marketplace and generally include an expiration date, (wherein the start date of the auction is the date the auction is made available to users), or effective date, and the minimum amount the seller is willing to take for providing the freight transportation services or the maximum amount the buyer is willing to pay for the freight transportation services being auctioned. However, a buyer or seller creating an auction may specify only a subset of users that are entitled to view and respond to the auction. These are known as "private auctions."

The order placed by the user generally includes an amount that meets or exceeds the seller's minimum amount (in the case of a freight order placed by a buyer in response to a seller's auction), or meets or is lower than the buyer's maximum amount (in the case of a demand order placed by a seller in response to a buyer's auction), or it is not accepted. The user may also indicate the maximum, or minimum amount that user is willing to pay or accept. As other orders are placed on the same auction, the marketplace will automatically increment (in the case of a freight order) or decrement (in the case of a demand order) the value in the user's order until the user's maximum or minimum price, respectively, is reached. The marketplace continually updates and displays the amount of the highest or lowest bid. However, the identities of the users placing the orders are not revealed to the other users placing orders on the same auction. The user may also indicate a reserve amount for the auction. If no orders are received that meet the reserve amount, neither the users placing the order or the user hosting the auction are obligated to enter into a tender agreement.

Figure 8:
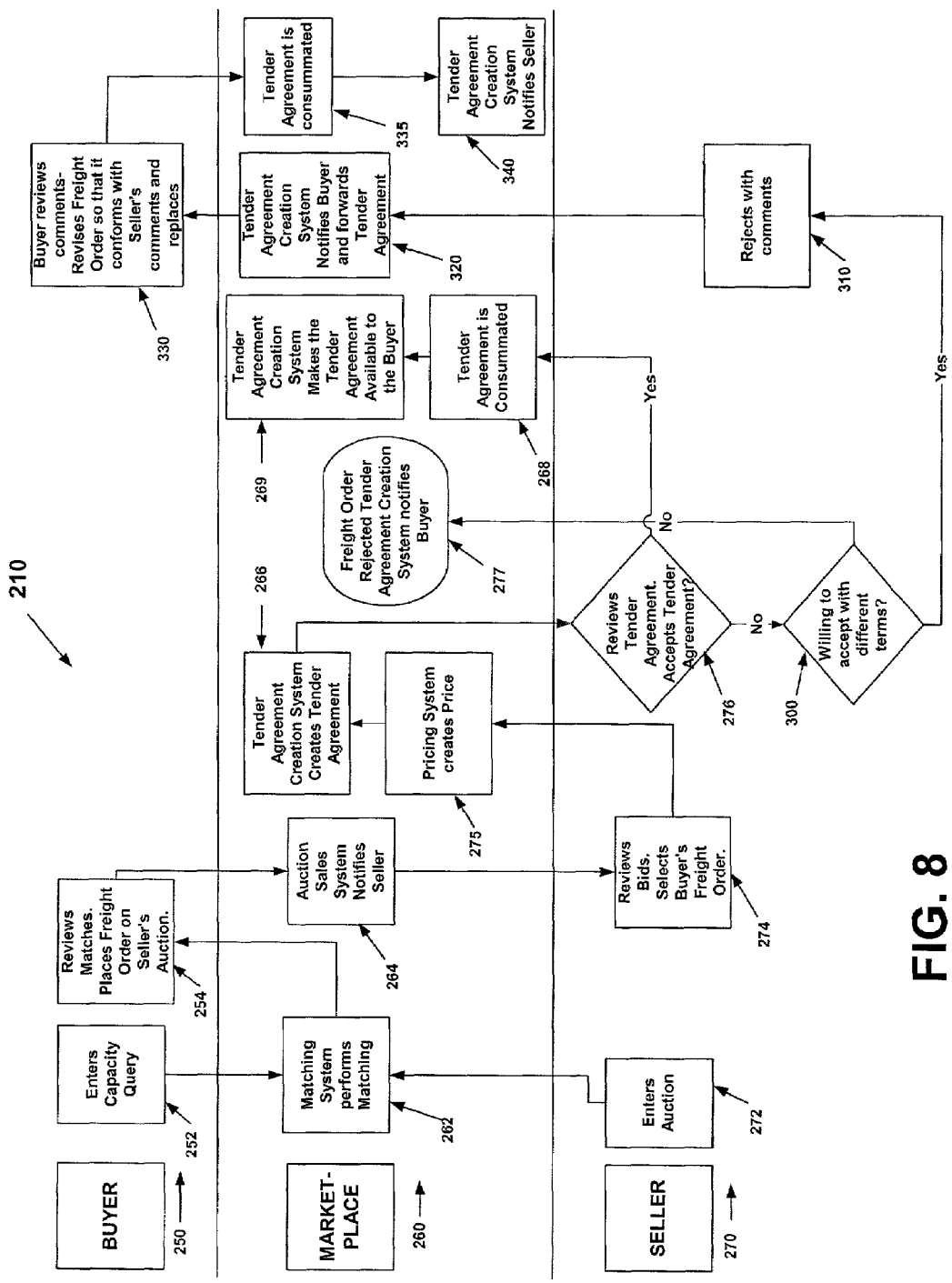
FIG. 8 is a swim-lane representation of an embodiment of a Seller's Auction.

FIG. 8 shows an example of the operation of the auction sales system 210. This example shows a buyer placing a query and an order on a seller's auction and includes the reject with comments feature. However, more than one buyer may place an auction on the same seller's auction. In the example shown in FIG. 8, the seller 270 enters an auction for freight transportation services 272 that the seller wishes to sell. The buyer 250 places a capacity query 252 that triggers the matching system to perform matching 262. The auctions and catalog rates with criteria found to correspond to that of the query are "matches." In addition to the auction and catalog rates with criteria found to correspond to that of the query, only those private auctions that the buyer is entitled to view and respond to and which correspond to the criteria specified in the query are returned as matches.

The matches are returned to the buyer 250. The buyer 250 is free to respond to one or more of the matches or to make no response at all. If the buyer 250 responds to a seller's auction (in other words places a bid) this is called placing a freight order 254. A freight order is a bid placed by a buyer in response to a seller's auction.

Once a freight order is placed 254, the marketplace notifies the seller 264. When the auction ends, the auction sales system notifies the seller and seller then reviews all the freight orders placed in response to that auction. The seller is free to accept or not accept any one of the freight orders 274. The seller 270 is free to select the freight order (or any other freight order placed by any other buyer) at anytime before the auction is scheduled to end and end the auction early. If the seller 270 selects a freight order 274, the pricing system creates a price 275 that will be included in the tender agreement.

The price generated by the pricing system is then used by the tender agreement creation system to create the tender agreement 266 between the buyer that placed the freight order and the seller. The tender agreement is then forwarded to the seller 270 who reviews and has the option of rejecting or accepting the tender agreement 276. Once the seller 270 accepts the tender agreement, the tender agreement is consummated 268 because the buyer is deemed to have accepted the tender agreement by placing the freight order. The tender agreement creation system then makes the tender agreement available to the buyer 269.

If the seller does not accept (rejects) the tender agreement, the seller then determines whether he or she is willing to accept the tender agreement with different terms 300. If the seller is not willing to accept it with different terms, the freight order and the tender agreement are rejected and the agreement creation system so notifies the buyer 277. If the seller rejects the tender agreement but is willing to accept it with different terms, the seller may reject the tender agreement with comments 310 (the "reject with comments" feature). The seller's comments are then included in the tender agreement. The comments may be included as an attached note or inputted directly into a note section of the tender agreement. The tender agreement creation system notifies the buyer and forwards to the buyer the tender agreement which includes the sellers comments 320. The buyer may then revise the freight order so that it conforms with the seller's comments and replaces the freight order 330 with the marketplace. The tender agreement is consummated 335 once the buyer replaces the freight that conforms with the seller's comments. The tender agreement creation system then notifies the seller 340.

The auction sales system 210 may also include an accept and continue feature. The accept and continue feature allows sellers to auction capacity, and buyer's to auction demand for capacity, on different pieces of equipment or for different loads, respectively, without holding a separate auction for each. For example, a seller may wish to auction the provision of freight transportation services and the capacity the seller has is five (5) trailers. Instead of auctioning the entire capacity, the seller may wish to auction the capacity one trailer at a time. In this case, the seller would create an auction for the provision of freight transportation services with a capacity of one (1) trailer and use the accept and continue feature. This feature would allow the seller to sell the capacity available on one piece of equipment (one trailer) and continue the auction until the capacity on each piece of equipment has been auctioned.

Figure 9:
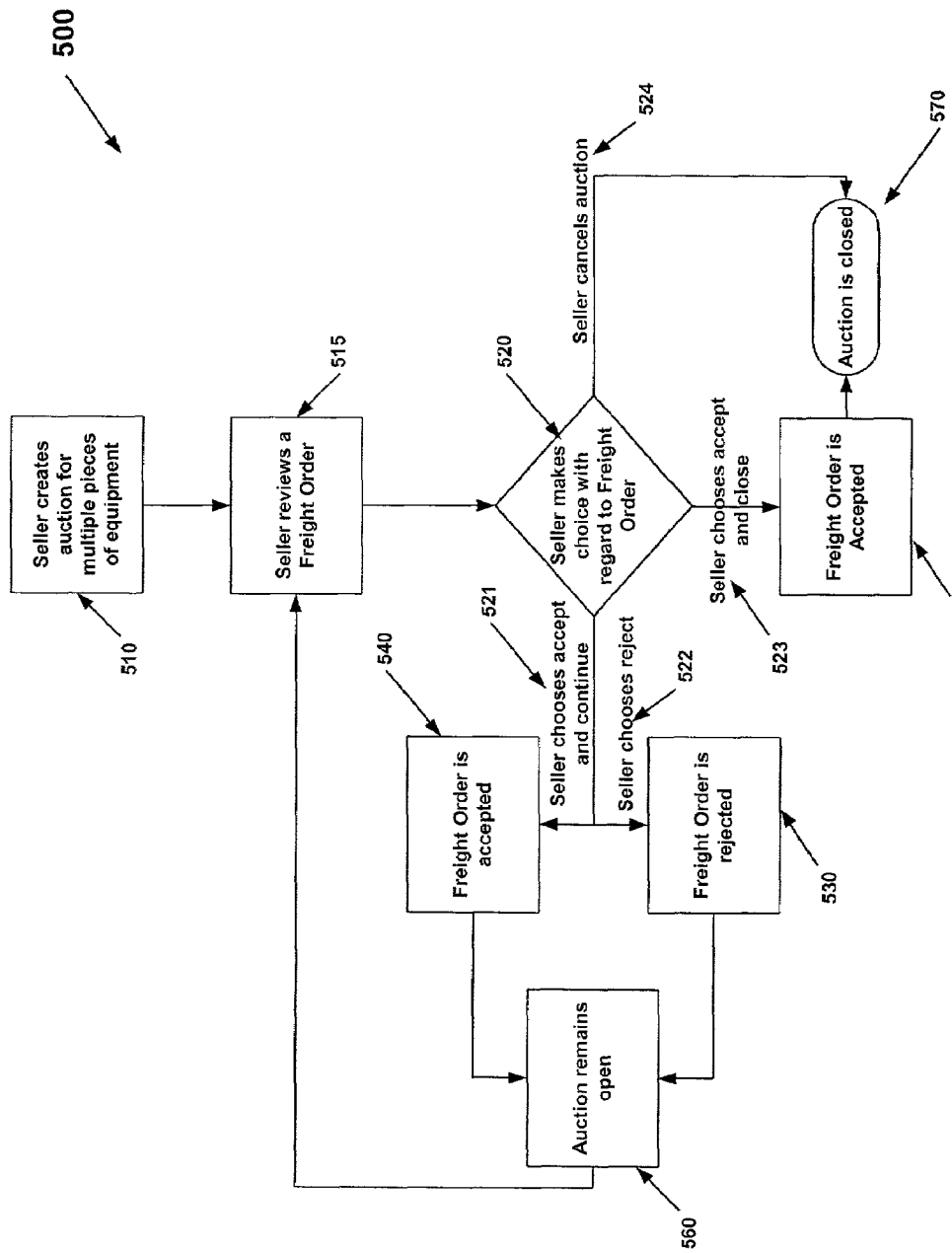
FIG. 9 is a flow chart representation of an embodiment of the Accept and Continue Feature.

An auction in which the accept and continue feature is used in almost the same manner as an auction in which the feature is not used. An embodiment of the accept and continue feature as used in a seller's auction is shown in FIG. 9. A seller's auction may include the accept and continue feature if the seller wishes to auction capacity available on multiple pieces of equipment, one or more pieces of equipment at a time, in the same auction. Although this example shows the use of the accept and continue feature in a seller's auction, the feature may also be applied to a buyer's auction.

To initiate the accept and continue feature 500, the seller creates an auction for which the terms are applicable to multiple pieces of equipment 510. Upon reviewing a freight order 515 that was submitted in response to the seller's auction, the seller has a choice to make with respect to that freight order 520, to reject the freight order 522, accept the freight order and close the auction ("accept and close") 523, accept the freight order and continue the auction ("accept and continue") 521, or cancel the auction 524. If the seller chooses to reject a freight order 522, the freight order is rejected 530 and the auction remains open 560. The seller is free to review another freight order 515 and continue the process. If the seller chooses to accept and continue 521, the freight order is accepted 540 and the auction proceeds as shown in FIG. 8 proceeding from step 275 with respect to the seller and the buyer that placed the accepted freight order. The marketplace generates a tender agreement including a price which is forwarded to the seller for review. If the seller accepts the tender agreement the tender agreement is consummated and made available to the buyer. However, the auction remains open 560 and the seller is free to review another freight order 515 and continue the process. Buyers may still submit freight orders in response to the seller's auction and the seller may continue to make a choice with regard to each freight order 520. Alternatively, at some point, the seller may choose accept and close 523 with regard to a freight order. With this choice, the seller accepts the freight order 527 the auction proceeds as shown in FIG. 8, proceeding from step 275, and the auction is otherwise closed 570. Additionally, the seller may close the seller's auction at anytime by canceling the auction 524.

Figure 10:
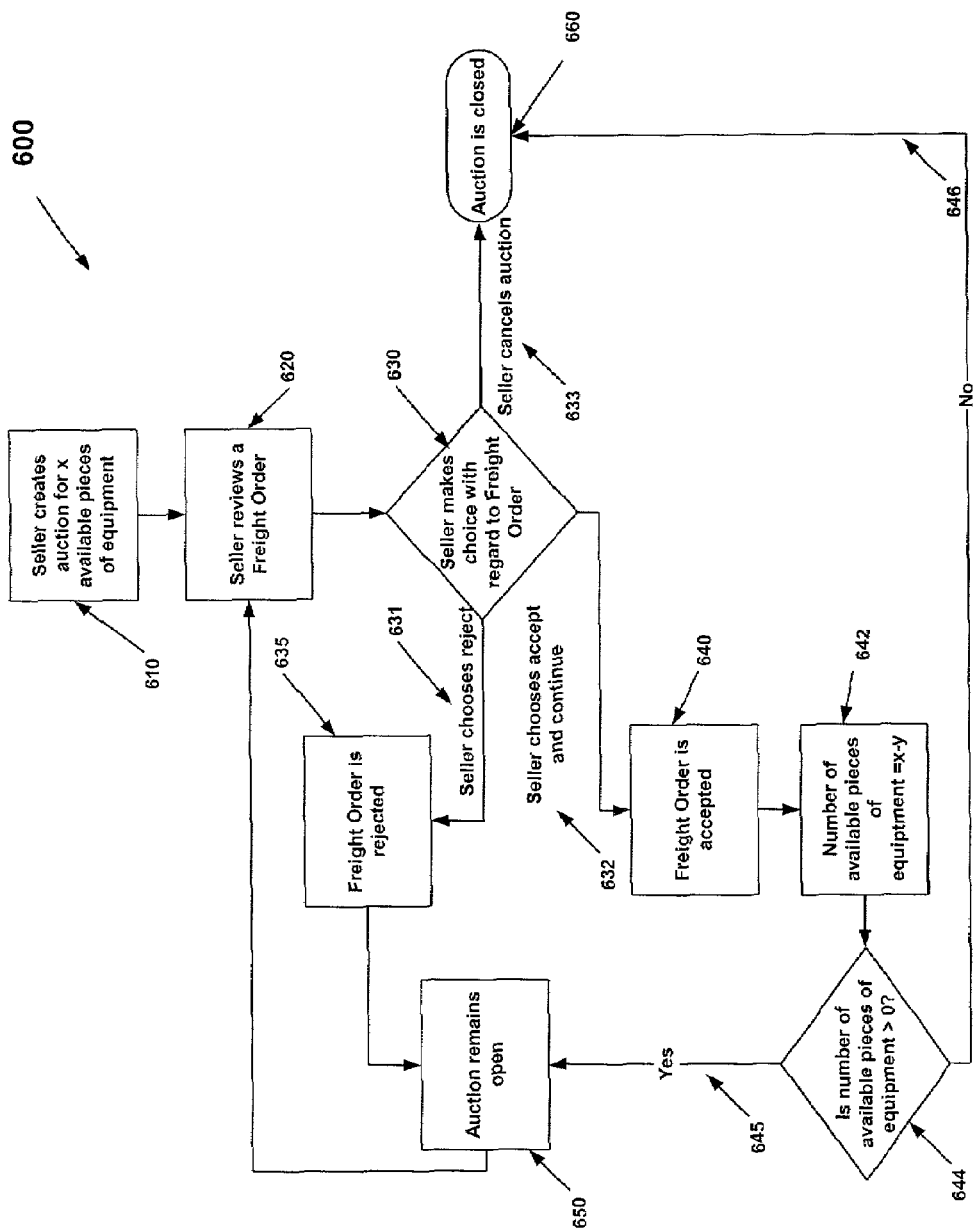
FIG. 10 is a flow chart representation of another embodiment of the Accept and Continue Feature.

In an alternate embodiment, shown in FIG. 10, of the accept and continue feature 600, the seller creates a seller's auction 610 in which the seller indicates the number of pieces of equipment that are available through that auction (indicated in FIG. 10 by "x"). Upon reviewing a freight order 620 placed in response to the seller's auction, the seller has a choice to make with respect to any freight order placed in response to the seller's auction 630, to reject the freight order 631, or accept the freight order and continue the auction ("accept and continue") 632, or cancel the auction 633. Each time after the seller chooses accept and continue 632, the freight order is accepted 640 and the auction sales system decrements the number of available pieces of equipment by the number ordered (indicated in FIG. 10 by "Y") 642. The auction sales system then determines if the number of pieces of equipment remaining are greater than zero 644. If any pieces of equipment remain 645 (the number of pieces of equipment remaining is greater than zero), the auction remains open 650 and the seller may review other freight orders 620 and continue the auction. If the auction sales system determines that no pieces of equipment remain 646 (the number of pieces of equipment remaining is zero) the auction is closed 660. The seller may also cancel the auction 633 at any time. In another alternate embodiment of the accept and continue feature, the seller can accept multiple freight orders simultaneously. Each time the seller accepts a freight order, as between the seller and the buyer who placed the accepted freight order, the auction also proceeds as shown in FIG. 8, proceeding from step 275.

Buyers may also create auctions called buyer's auctions in which they can auction their shipping demands, in a process that parallels the process shown in FIG. 8. Sellers can place queries called "demand queries" that request the matching system to perform matching. Matching, in response to a demand query, involves finding buyer's auctions that have characteristics that match those defined by the seller in the demand query. The seller may then review the matches returned by the matching system and is free to respond to one or more of the matches or to make no response at all. If a seller responds to a buyer's auction, in other words places a bid or order on a buyers auction, this is known as placing a demand order. Once a demand order is placed, the auction-sales system notifies the buyer.

When the auction has ended, the auction sales system notifies the buyer and the buyer then reviews all the demand orders placed in response to that auction. The buyer is free to accept or not accept any one of the demand orders. Additionally, a buyer is free to review and/or accept or reject any demand order, from any seller, at anytime before the auction is scheduled to end. If the buyer's auction was to auction the need for freight transportation services for multiple loads, the buyer may also accept and continue or accept and stop in the manner previously described for the seller's auction. Additionally, the buyer may reject any demand order or reject any demand order with comments in a manner consistent with that previously disclosed for the seller's auction. If the buyer accepts a demand order, the pricing system creates a price that will be included in the tender agreement.

The price generated by the pricing system is then used by the tender agreement creation system to create the tender agreement between the seller that placed the demand order and the buyer. The tender agreement is then forwarded to the buyer who reviews and has the option of rejecting or accepting the tender agreement. Once the buyer accepts the tender agreement, the tender agreement is consummated and the tender agreement creation system makes the tender agreement available to the seller. The seller is deemed to have accepted the tender agreement by placing the demand order.

The user interface portion uses manual and/or 1-way interaction with process enrichment interaction levels to enable the accept and continue feature. When manual interaction is used, sellers and buyers must manually submit changes in their available capacity and number of loads that need to be transported, respectively, to the marketplace. The marketplace must then update this information in the auction sales system. Sellers and buyers can communicate this information over a network, for instance, but not limited to, using a web user interface. Alternately, when the 1-way interaction with process enrichment interaction is used, the seller's computer system and the buyer's computer systems can communicate changes in capacity and loads in need of transport, respectively, directly to the marketplace's computer system. The seller's and buyer's computer systems can communicate this information to the marketplace's computer system over a network using any format compatible with the network and the marketplace, including, but not limited to flat file, XLS, EDI and XML.

Matching System. The matching system is triggered when a user enters a query (a request for a match) that contains criteria for the freight transportation services the user is trying to buy or sell. The user may save these criteria in a template for future and/or repetitive use. Once a user enters a query, the matching system performs "matching" wherein the matching system searches the catalog rates and/or auctions available in the marketplace for those that have characteristics that satisfy the criteria specified in the query. More specifically, if a buyer enters a query (a "capacity query"), the matching system 220 then searches for catalog rates and seller's auctions that satisfy the criteria specified in the query. Additionally, in the case of a capacity query, the matching system will create marketplace-created multi-leg freight transportation services that satisfy the criteria specified in the query. These resulting catalog rates and seller's auctions are deemed "matches" that are then presented to the buyer that entered the query. If a seller enters a query (a "demand query"), the matching system 220 then searches for buyer's auctions that satisfy the criteria specified in the capacity query. The resulting buyer's auctions are deemed "matches" that are then presented to the seller that entered the demand query. The matches, whether found in response to a demand or capacity query, may be sorted and/or filtered so that the matches are displayed in a particular order or so that only certain matches are displayed, respectively. Matches may be sorted according to any number of the characteristics of the match, such as, but not limited to, price or geography. The matches may also be filtered in any number of ways so that only a subset of matches with a desire feature are shown. Additionally, the matches may include both single-leg and multi-leg matches.

A wide variety of criteria may be used to match freight queries with catalog rates and seller's auctions, and to match demand queries with buyer's auctions. The criteria may include that the pick up time indicated in the freight order or demand order must fall within the effective date of the catalog rate or the auction. The criteria may also require compatibility between certain query criteria and certain auction or catalog rate criteria. For instance, compatibility may be required with respect to product type (dry, refrigerated, etc.), and/or, equipment length. In one embodiment, the matching system returns all auctions and/or catalog rates that match all criteria except capacity. Auctions and/or catalog rates that do not have the required capacity, but otherwise are compatible, are returned as matches but labeled "infeasible" ("infeasible matches"). This gives the user that placed the query the opportunity to change the capacity criteria to perhaps obtain a better rate. Additionally, buyers and sellers can define users or customers with whom they do not wish to do business. These are called "restrictions." If a buyer or seller indicates restrictions in their profile, matches will not include these restrictions. In another embodiment, the matching system will only return as matches auctions and catalog rates that have an effective date that is compatible with the pick up and/or delivery date indicated in the query, and geography, and type of equipment which is also compatible with that of the query.

Tender Agreement Creation System. The tender agreement creation system 240 is the system that creates a tender agreement between a buyer and seller in response to the creation of a purchase event. Purchase events include, but are not limited to, the placement of a catalog order and the acceptance of a freight order or a demand order. The tender agreement is a binding agreement between a buyer and seller of freight transportation services that includes the terms for the provision of the freight transportation services, including the price generated by the pricing system. The tender agreement creation system 240 may also permit the parties to execute some changes and updates to the tender agreement after the tender agreement has been consummated. Generally, the tender agreement includes a section where the buyer and seller can include comments (the "notes section"). The buyer and seller may seek clarification, update information, request deviations from the seller's rules tariffs, and request other changes to the tender agreement by entering information into the notes section and submitting the tender agreement to the marketplace which will then forward it to the other user. The other user may then also enter information into the notes section and forward the tender agreement to the marketplace wherein the marketplace forwards it back to the first user. This process may be repeated until the users have reached a conclusion.

The user interface portion that supports the tender agreement creation system 240 uses, in any combination, manual interaction, 1-way interaction, and 1-way interaction with process enrichment to allow the marketplace to communicate with the users. Using manual interaction, the marketplace communicates any necessary information relating to the tender agreement creation system 240 to the users. This communication can be accomplished in many ways including, but not limited to, using a web user interface. Using 1-way interaction, the marketplace's computer system communicates the necessary information directly to the users' computer systems. This can be accomplished over a network using any format compatible with the network and the marketplace, including, but not limited to EDI. Additionally, using 1-way interaction with process enrichment, users can prompt their computer systems to communicate directly with the marketplace, wherein the users' computer systems are triggered to take action, such as, sending a copy of the tender agreement to a consignee. This communication can be accomplished over a network using any format compatible with the network and the marketplace, including, but not limited to EDI and XML.

Pricing System. The pricing system determines the price for freight transportation services that is incorporated into the tender agreement. The price actually includes two separate amounts, the "buyer's price" and the "seller's price." The buyer's price is the total amount the buyer is to pay for the freight transportation services they are buying, which includes the amounts charged by the seller or sellers for providing the freight transportation services or multi-leg freight transportation services, respectively, (the "seller's charges") plus any fees and discounts applied by the marketplace (the "marketplace fees") that are applicable to the buyer. The seller's price is the total amount the seller will receive for providing the freight transportation services, which includes the seller's charges minus the marketplace fees applicable to the seller. The seller's charges is the total amount charged by the seller for providing the freight transportation services including the fees for providing the service, fuel surcharges and accessorial fees. For services purchased through an auction, the seller's charges is the final auction price. Catalog rates, however, do not include fuel surcharges and accessorial fees. Therefore, for freight transportation services purchased from a seller's catalog rates, the price system generally obtains the fuel surcharge fees and accessorial fees from the rate management system and adds them to the catalog rate to obtain the seller's charges. Generally, the pricing system calculates the total catalog rate. For example, if the catalog rate is a per mile rate, the pricing system determines the total catalog rate based on the distance that the freight is to be transported and then applies any fuel surcharge and accessorial fees. Alternatively, the seller may specify and flat rate and therefore, the total catalog rate will be the flat rate specified by the seller plus any applicable fuel surcharge and accessorial fees.

The pricing system also determines the marketplace fees. The marketplace fees may include exchange transaction fees, cancellation fees and payment option fees. The discounts may include payment method discounts.

Exchange transaction fees are per-transaction fees charged to both the buyer and the seller for the privilege of using the marketplace. This fee is charged to all users involved in a tender agreement. The exchange fee can be a flat-fee or based on a percentage of the actual freight charges and the fuel surcharge fees specified in the tender agreement. The exchange transaction fee charged to the buyer is known as the buyer transaction fee and the exchange transaction fee charged to the seller is known as the seller transaction fee. If the seller is involved in a multi-leg transaction, the exchange transaction fee is apportioned among all the sellers involved and is proportional to a particular seller's share of the total price charged the buyer. The pricing system may have multiple exchange transaction fees, each with a different effective date. Additionally, if a user retracts a tender agreement after it has been consummated, the marketplace may charge that user a cancellation fee. This may be a flat fee or a fee based on a percentage of the actual freight charges and any applicable fees that would have been paid had the freight transportation services indicated in the tender agreement been fully performed. The payment option fee is a fee charged to buyers proportional to the time period following proof of delivery after which funds are removed from the buyer's account. The payment method discount is a discount given to buyers who have authorized payment directly from an account that is established with an organization that is not a credit card company.

Order Fulfillment System.

Another of the subsystems of the marketplace is the order fulfillment system, which is shown in FIG. 11. The order fulfillment system 40 enables the process of taking a tender agreement from approval through proof of delivery ("POD") and the collection of payment ("order fulfillment"). In other words, the order fulfillment system 40 enables the tender agreement to be fulfilled. Included in the order fulfillment system are subsystems that (1) deal with changes in circumstance: an exception management system 410 and an accessorial fee update system 415 and (2) facilitate payment: a payment system 420, a collection system 430 and an invoicing system 440.

Figure 12:
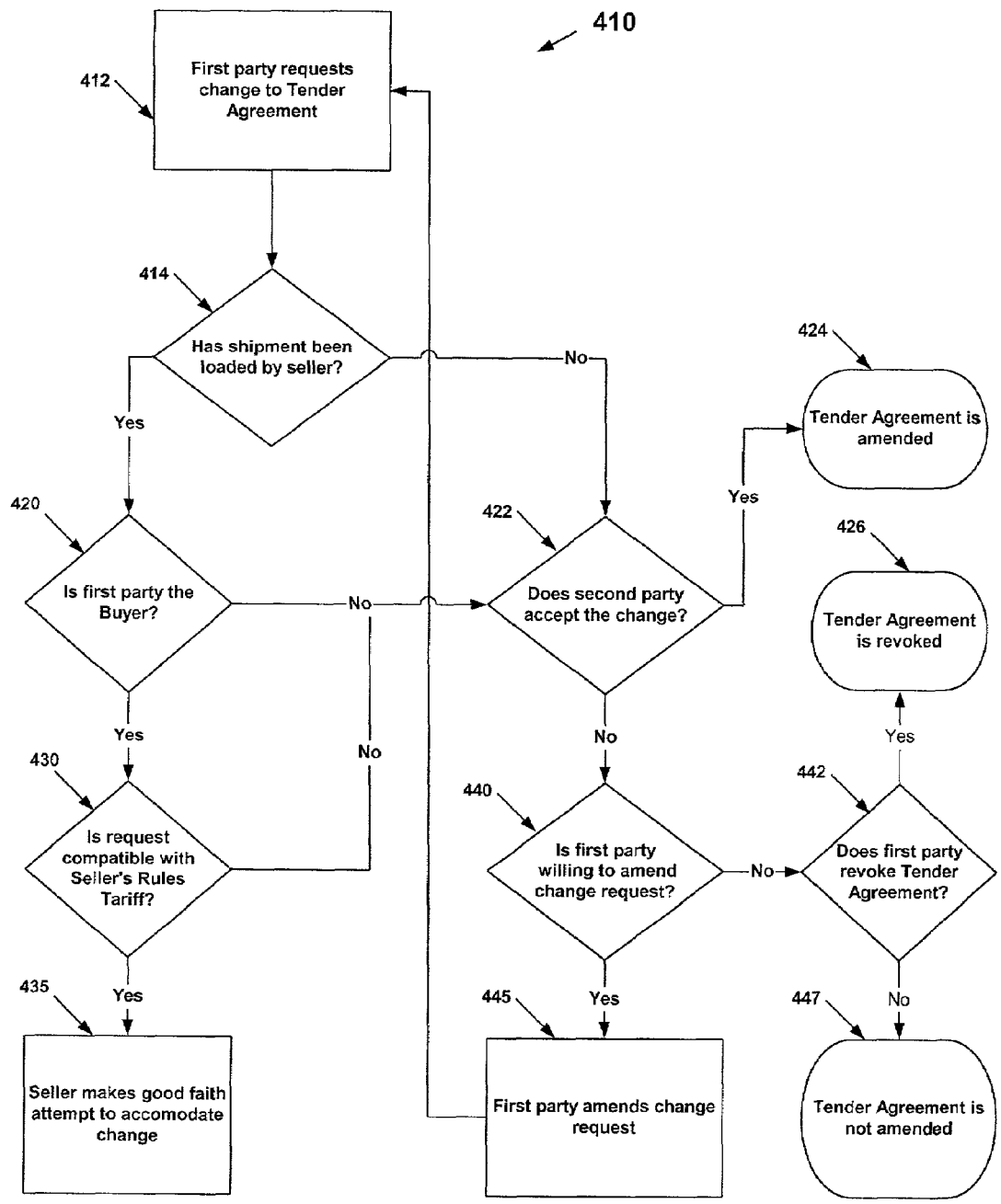
FIG. 12 is a flow-chart representation of an embodiment of the Exception Management System.

The exception management system 410 is the system that enables the tender agreement to be modified after it has been consummated. The buyer and seller may wish to modify the tender agreement due to unforeseen events or merely for their convenience. In one embodiment, the exception management system enables the buyer and seller to communicate to each other their desire for a change in the tender agreement system, provides the rules by which any changes are accepted, and determines whether such change is acceptable or if or the tender agreement may be revoked. A flow chart representation of an embodiment of the exception management system is shown in FIG. 12. Alternatively, or additionally, the buyer and seller make alternative, mutually agreed upon changes which are facilitated by the marketplace. For instance, after the tender agreement is consummated, the buyer and seller may mutually agree to changes in the tender agreement using the "notes" section of the tender agreement itself.

The party that desires to change the tender agreement (the first party) submits a request for the desired change to the marketplace 412. If the shipment has not already been loaded by the seller, the other party (the second party) is notified of the request and can decide whether to accept the change 422. If the second party accepts the change, the tender agreement is amended to reflect the requested change 424. If the second party does not accept the change, the first party is notified and given an opportunity to amend the change request 440. If the first party does not wish to amend the change request, the first party has the option of revoking the tender agreement 442. If the first party revokes the tender agreement, the tender agreement is revoked 426 and the second party is so notified. If the first party does not revoke the tender agreement, the tender agreement is not amended and remains unchanged 447. On the other hand, if the first party is willing to amend the change request and does so 445, the first party submits the revised request for a change to the tender agreement and the process begins again 412.

If the shipment has been loaded by the seller, the marketplace determines whether the first party is the buyer or the seller 420. If the first party is the seller (is not the buyer), the buyer (the second party) may choose whether to accept the change 422 and the process follows the steps as previously described. If the first party is the buyer, the marketplace determines whether the requested change to the tender agreement is compatible with the seller's rules tariffs. If the requested change is not so compatible, the seller (the second party) may choose whether to accept the change 422 and the process follows the steps as previously described. However, if the requested change is compatible with the seller's rules tariff, then the seller is required to make a good faith attempt to accommodate the requested change 435.

Figure 13:
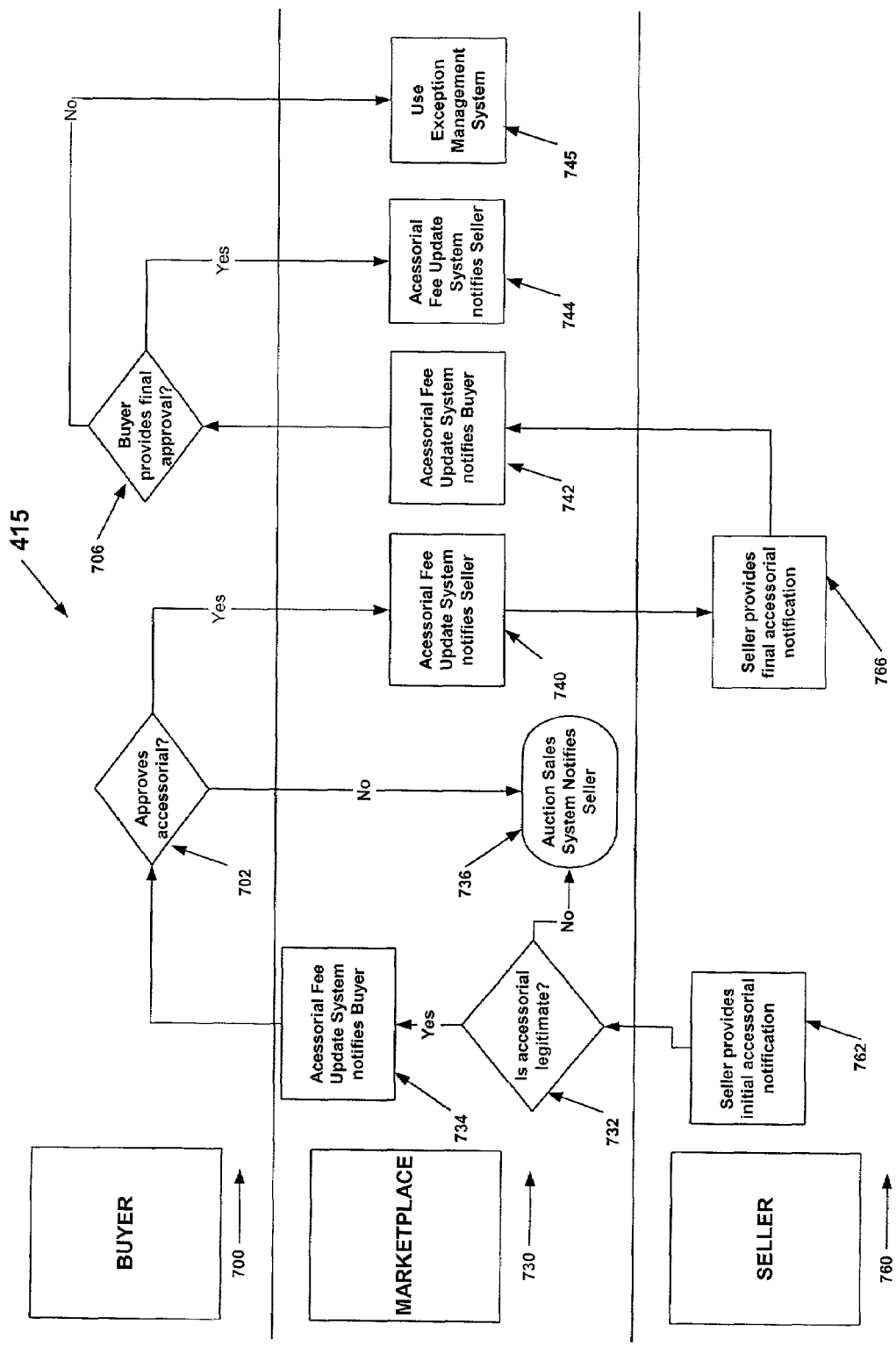
FIG. 13 is a swim-lane representation of an embodiment of the Accessorial Fee Update System.

Another of the order fulfillment subsystems that deals with changes in circumstance is the accessorial fee update system. The accessorial fee update system is the system that enables sellers to recover accessorial fees not otherwise provided for by the accessorial fee management system. FIG. 13 shows an embodiment of the accessorial fee update system 415. When, in the course of providing freight transportation services, the seller first becomes aware of a potential accessorial event (an event that will result in an accessorial fee being assessed against the buyer), the seller provides initial notification to the accessorial fee update system 762. The accessorial fee update system then determines if the accessorial event is legitimate 732 by seeing if such an event is covered in the seller's tariff rates or the tender agreement. If the accessorial event is not legitimate, the accessorial fee update system notifies the seller of such and instructs the seller not to proceed 736. If the accessorial event is legitimate, the accessorial fee update system notifies the buyer 734 and the buyer has the opportunity to approve the accessorial event 702. If the buyer does not approve the event, the accessorial fee update system notifies the seller and instructs the seller not to proceed with the accessorial event 736. If the buyer does approve the accessorial event, the accessorial fee update system notifies the seller 740 and instructs the tender agreement creation system 240, shown in FIG. 6, to update the tender agreement. The tender agreement creation system updates the tender agreement to reflect the changes in the accessorial fees. When the accessorial event appears imminent, the seller gives the accessorial fee update system final notice of the accessorial event ("final accessorial notification") 766, and the accessorial fee update system notifies the buyer 742. The buyer must then decide whether to give final approval 706 If the buyer gives final approval, the accessorial fee update system notifies the seller 744 and the seller can incur the accessorial fee. If the buyer does not give final approval, the buyer and seller may then use the exception management system 745, as shown in FIG. 12, to resolve the resulting dilemma.

One of the order fulfillment subsystems that facilitates payment is the payment system. The payment system 420, as shown in FIG. 11, is the system that provides and guarantees payment to sellers and allows users to establish payment accounts. The marketplace generally guarantees that the seller will get paid if the seller provides POD even in the event that the buyer does not or cannot pay. The marketplace generally guarantees the seller's charges, but may alternatively, not guarantee any or all of the accessorial fees and fuel surcharges. Payment is guaranteed through the automated payment and distribution system. Additionally, the marketplace will pay the seller in the event its other efforts fail to elicit payment from the buyer. Payment accounts are accounts established to enable users to make and/or receive payments. These accounts may include open accounts, cash accounts, credit card accounts, credit accounts or other such account. The payment system 420 includes automated collection and distribution.

Automated payment and distribution is the system that moves funds from a buyer's payment account to a seller's payment account upon the occurrence of predefined events. These events may be defined as track and trace events. One example of how this system may work is that when the marketplace receives a POD from the seller, this triggers a track and trace event. The resulting track and trace event triggers the automated payment and distribution system, after the predetermined time period has passed, to remove funds sufficient to cover the buyer's price from the buyer's payment account. Subsequently, after another predetermined time period has passed, the automated payment and distribution system are triggered to move an amount equal to the seller's price to the seller's payment account.

The collection and invoicing systems are the systems by which the marketplace collects funds from users. It may be used instead of or in addition to the payment system. In one embodiment, it is used as a supplement or backup to the pricing system. The invoicing system records all transactions and sees to it that invoices are sent to customers containing information regarding their payment accounts and summarizing any amounts due to the marketplace. The act of sending the actual invoices may be performed by the marketplace or contracted out to an outside entity.

Action Defining System.

Another major subsystem of the marketplace is the action defining system 50, shown in FIG. 1. The action defining system is a system for defining at a given point in time, the possible actions that may be taken by a user of a marketplace and the consequences that will result from a user taking a particular action. In the action defining system, the possible actions are defined by user roles, and event type and status. Each role is associated with a privilege that defines the possible actions that a user may take and a scope that defines the information to which a user has access with regard to a particular "type" of event. The state or situation of a type is indicated by its "status." A type and status pair defines the state or situation of an event at a given point in time. The privilege associated with the role assigned to a user defines the possible actions in which the user may engage and the scope defines the information that the user may view. The type and status restricts the range of possible actions in which the user may engage and the information which the user may view with respect to a given event at a particular point in time.

Roles, and the privileges and scope associated with them may be assigned to users in the account management system 20 (shown in FIG. 1) or other similar system or assigned directly in the action defining system. Event types, statuses, and the pairing of types with statuses are defined within the action defining system, as are the permissible actions and their association with roles and event type and status.

The following will illustrate the use of the action defining system as may be used in a marketplace for buying and selling freight transportation services. However, it will be obvious to those of skill in the art that the action defining system has application in a wide variety of marketplaces and other similar applications, particularly those associated with buying and selling goods and services. In the freight transportation marketplace, the types of events include, orders, auctions, catalog rates and tender agreements. At a given point in time, these types may be assigned a status, such as, entered, auction, pending, accepted, en route, delivered, history, rejected or retracted. The actions that a user may take with respect to these events include, create, cancel, revise, order, update accept, retract and others. If a user is assigned the role of "buyer," one of the privileges assigned to this user by virtue of being associated with the buyer role is the ability to purchase or buy freight transportation services. Therefore, the buyer may only engage in actions that are associated with the purchase of freight transportation services. These possible actions will be restricted by the type of event that is taking place and the status of that event at a particular point in time. The scope assigned to the buyer role would, at a minimum, allow the buyer to view information related to that buyer's purchase of freight transportation services.

FIG. 14 shows a chart that illustrates the possible actions that a buyer may take with regard to the order, auction and tender agreement events (listed on the y-axis), depending on the status of the event (listed on the x-axis). In this chart, an "N/S" indicates that the indicated status does not apply to the indicated event and a dashed line "—" indicates that, for the buyer, the action is not available for that type and status. For instance, when a freight order has "pending" status, the buyer may revise or cancel the freight order. Once that freight order has "accepted" or "en route" status, the buyer can no longer cancel or revise that freight order. However, a tender agreement with "accepted" or "en route" status may be retracted. If a demand order has "pending" status, the buyer may accept, reject or take no action at all with respect to that demand order. Taking no action at all is almost always an option.

FIG. 15 shows a chart that, in a manner similar to that in FIG. 14, illustrates the possible actions that a seller may take with regard to order, auction and tender agreement events (listed on the y-axis), depending on the status of the event (listed on the x-axis). When a freight order has "pending" status, the seller may accept or reject the freight order. In an alternative embodiment, the seller will also have the option to choose the actions "accept and continue" and "accept and stop."

The action defining system also defines, at a given point in time, the consequences that will result from a user taking a particular action with regard to a particular event. These consequences may include, changing the status of another event, sending a notice to a user or users, determining the information available to a user and updating auctions and catalog rates available for matching. The examples that follow illustrate examples of these consequences. If either the buyer or the seller retracts a tender agreement, this causes the order's, whether it be a freight or demand order, status to becomes "cancelled." Seller's and buyer's auctions are available for matching only when they are in "active" status. If after accepting a freight order (the freight order having accepted status) a seller rejects the tender agreement, this will cause the freight order to revert to "entered" status. Additionally, with almost every action, the marketplace sends a notice to the parties involved. Certain actions will cause the marketplace to update the auctions and catalog rates available for matching. For example, if a seller accepts a freight order made in response to a seller's auction, the marketplace will eliminate that seller's auction from the auctions that are eligible to be matched to freight queries. Likewise, if a seller has set up a seller's auction that uses the "accept and continue" function, when the seller accepts a freight order by taking the accept and continue action, the marketplace will not eliminate that seller's auction from the auctions that are eligible for matching but may decrement the number of pieces of equipment available in that seller's auction.

Another example of how the action defining system defines consequences for user actions with regard to a particular event having a particular status can be seen in the management of catalog rates. When a seller enters catalog rates into the marketplace, these rates are given "pending" status. While in "pending" status, the buyer can take no action with regard to these catalog rates. In fact, the buyer cannot even view theses catalog rates. However, the seller is free to revise, accept or delete them. Only when the seller accepts the catalog rates are they granted "accepted" status and become available to buyers.

It will be apparent to those skilled in the art that various modifications and variations can be made in the method and system of the present invention without departing from the spirit or scope of the invention. Thus, it is intended that the present invention include modifications and variations that are within the scope of the appended claims and their equivalents.

We claim:

1. A freight transportation marketplace system accessible to users over a network, comprising:
   an account management system that assigns roles from a group of roles including a buyer role and a seller role to the users and wherein the account management system defines buyer accounts and seller accounts for at least some of the users;
   a buy/sell system for the creation of a tender agreement between at least two users;
   an order fulfillment system, wherein the order fulfillment system enables fulfillment of the tender agreement and includes an exception management system; and
   an action defining system that defines possible user actions, possible user information and consequences of the possible user actions;
   a user interface that permits communication over the network among the marketplace and the users; and
   wherein the seller's account includes a seller's rules tariff, the tender agreement is for a shipment and was consummated by a first party and a second party and the exception management system comprises the means for, the marketplace:
      allowing the first party to make a request for a change;
      determining if the shipment has been loaded;
      determining if the first party has the role of buyer;
      determining if the change is compatible with the seller's rules tariffs;
      if the shipment has been loaded and the first party does not have the role of buyer, or if the shipment has been loaded and the first party does have the role of buyer and the change is not compatible with the seller's rules tariff, or if the shipment has not been loaded, determining whether the second party accepts the change;
      if the second party accepts the change, amending the tender agreement to reflect the change;
      if the second party does not accept the change, determining whether the first party is willing to amend the request for a change;
         if the first party is not willing to amend the request for a change determining whether the first party wishes to revoke the tender agreement;
            if the first party wishes to revoke the tender agreement, revoking the tender agreement;
         if the first party is willing to amend the request for a change, allowing the first party to amend the request for a change, thus creating an amended request for a change, and to make the amended request for a change;
      if the shipment has been loaded, the first party is the buyer, and the change request is compatible with the seller's rules tariff, allowing the seller to make a good faith attempt to accommodate the change request.

2. A freight transportation marketplace system as claimed in claim 1, wherein the exception management system allows the tender agreement to be modified after it has been consummated.

3. A freight transportation marketplace system as claimed in claim 1, wherein the order fulfillment system further comprises an accessorial fee update system.

4. A freight transportation marketplace system as claimed in claim 3, wherein the order fulfillment system further comprises means for accessorial events and wherein the marketplace determines whether the accessorial events are legitimate.

5. A freight transportation marketplace system as claimed in claim 4, wherein the accessorial fee update system comprises means for the seller to provide a final accessorial notification to the marketplace of an accessorial fee.

6. A freight transportation marketplace system as claimed in claim 5, wherein the buyer can approve or not approve the accessorial fee after the seller provides the final accessorial notification to the marketplace.

7. A freight transportation marketplace system as claimed in claim 6, wherein if the buyer does not approve the accessorial fee, thereby creating a dilemma, the buyer and seller may use the exception management system to resolve the dilemma.

8. A freight transportation marketplace system accessible to users over a network, comprising:
   an account management system that assigns roles to the users;
   a buy/sell system for the creation of a tender agreement between at least two users;
   an order fulfillment system, wherein the order fulfillment system enables fulfillment of the tender agreement;
   an action defining system that defines possible user actions, possible user information and consequences of the possible user actions, comprises roles and events, wherein roles are assigned to users;
   wherein the possible user actions and the consequences of the possible user actions are defined by the roles and events;
   wherein the possible user information is defined by the roles and events;
   wherein any of the roles combined with any one of the events comprises a role/event combination;
   wherein the possible user actions and the consequences of the possible user actions are defined by the role/event combination; and
   the possible user information is defined by the role/event combination;

a user interface that permits communication over the network among the marketplace and the users; and wherein, in the action defining system:

the roles include at least one privilege, wherein the at least one privilege defines the possible user actions; and at least one scope, wherein the at least one scope defines the possible user information; and the events include at least one type; and at least one status wherein the at least one status defines a state of the type at a point in time and wherein the type and status restrict the possible user actions defined by the at least one privilege and the possible user information defined by the scope and together with the privilege and scope define the consequences of the possible user actions.

9. A freight transportation marketplace system as claimed in claim 8, wherein, in the action defining system, each of the at least one status does not define every at least one type.

10. A freight transportation marketplace system as claimed in claim 8, wherein, in the action defining system the roles comprise a buyer and a seller.

11. A freight transportation marketplace system as claimed in claim 10, wherein, in the action defining system, the roles are defined by the account management system.

12. A freight transportation marketplace system as claimed in claim 10, wherein, in the action defining system, the buyer is assigned a privilege, wherein the privilege includes purchasing freight transportation services; and a scope, wherein the scope includes information relating to purchasing freight transportation services.

13. A freight transportation marketplace system as claimed in claim 10, wherein, in the action defining system, the seller is assigned a privilege, wherein the privilege includes selling freight transportation services; and a scope, wherein the scope includes information relating to selling freight transportation services.

14. A freight transportation marketplace system as claimed in claim 13, wherein, in the action defining system, the possible user actions, and the possible user information are further defined by an event and wherein the event together with the role defines the consequences of the possible user actions.

15. A freight transportation marketplace system as claimed in claim 14, wherein, in the action defining system, the event comprises:

a type; and a status wherein the status defines the state of the type at a point in time.

16. A freight transportation marketplace system as claimed in claim 15, wherein, in the action defining system, the type includes one from a group consisting of the following: order, catalog rate, auction or tender agreement.

17. A freight transportation marketplace system as claimed in claim 16, wherein, in the action defining system, the status includes one from a group consisting of the following: entered, auction, pending, accepted, en route, delivered, history, rejected or retracted.

18. A freight transportation marketplace system accessible to users over a network, comprising:

an account management system that assigns roles to the users, wherein the roles include buyers, sellers and account administrators and defines buyer and seller accounts and buyer and seller operations, wherein the account management system comprises:

an account maintenance system that includes a user level which includes at least one user and defines user operations, a user group level which includes at least one user group and defines the buyer and seller accounts, wherein the at least one user group includes at least one user and defines the accounts and the roles, and a payor group level which includes at least one payor group and defines a membership status and the user groups, a rate management system for the seller accounts which includes a catalog rate management system, a fuel surcharge management system, and an accessorial fee management system, a track and trace system that archives track and trace events wherein the track and trace events archive the operations, and a reporting system that lists the operations archived by the track and trace system, a buy/sell system for the creation of a tender agreement between at least a buyer and a seller, comprising:

a catalog sales system which facilitates private and public sales, an auction sales system which may includes seller's auctions and buyer's auctions, multi-leg freight transportation services, including multi-modal freight transportation services, seller-created multi-leg freight transportation services and marketplace-created freight transportation services, wherein the multi-leg freight transportation services are sold through the catalog sales system and the auction sales system, a matching system that, in response to a capacity query or a demand query, produces all matches from the catalog sales system and the auction sales system, a system for creating a purchase event, wherein the purchase event is created in response to the selection of any match by a user, a pricing system that creates a price for the selected match, and a tender agreement creation system which begins in response to the creation of a purchase event, allows at least two of the at least two users to review, negotiate, approve and cancel the tender agreement, consummates the tender agreement upon acceptance by the at least two users and includes the price;

an order fulfillment system for the tender agreement which includes an exception management system which allows the at least two users to modify the tender agreement, a payment system which includes automated payment and distribution; and an action defining system, comprising means for determining at least one role, wherein at least one role is assigned to each of the users, comprising at least one privilege, wherein the at least one privilege defines possible user actions, and at least one scope, wherein the at least one scope defines possible user information, and at least one event, comprising:

at least one type, and at least one status, wherein the at least one status defines a state of the type at a point in time, and wherein the type and status restrict the possible user actions defined by the at least one privilege and the possible user information defined by the scope and together with the privilege and the scope, define consequences of the possible user actions.

19. An order fulfillment system accessible over a network by buyers and sellers which enables fulfillment of a tender agreement, comprising:
a exception management system enabling the tender agreement to be canceled;
a payment system; and
a seller's account which includes a seller's rules tariff and wherein the tender agreement is for a shipment and was consummated by a first party and a second party and the exception management system comprises the means for:
allowing the first party to make a request for a change;
determining if the shipment has been loaded;
determining if the first party has the role of buyer;
determining if the change is compatible with the seller's rules tariffs;
if the shipment has been loaded and the first party does not have the role of buyer, or if the shipment has been loaded and the first party does have the role of buyer and the change is not compatible with the seller's rules tariff, or if the shipment has not been loaded, determining whether the second party accepts the change;
if the second party accepts the change, amending the tender agreement to reflect the change;
if the second party does not accept the change, determining whether the first party is willing to amend the request for a change;
if the first party is not willing to amend the request for a change determining whether the first party wishes to revoke the tender agreement;
if the first party wishes to revoke the tender agreement, revoking the tender agreement;
if the first party is willing to amend the request for a change, allowing the first party to amend the request for a change and make a request for the amended request for a change;
if the shipment has been loaded, the first party is the buyer, and the change request is compatible with the seller's rules tariff allowing the seller to make a good faith attempt to accommodate the change request.

20. An order fulfillment system as claimed in claim 19, wherein the payment system includes automated collection and disbursement system.

21. An order fulfillment system as claimed in claim 20, wherein automated collection and disbursement system is initiated in response to track and trace events.

22. An order fulfillment system as claimed in claim 19, further comprising a collection system.

23. An order fulfillment system as claimed in claim 22, further comprising a invoicing system.

24. An order fulfillment system as claimed in claim 22, further comprising an accessorial fee update system.

25. An order fulfillment system as claimed in claim 24, wherein the accessorial fee update system comprises the seller providing a final accessorial notification to the marketplace of an accessorial fee.

26. An order fulfillment system as claimed in claim 24, wherein the buyer can approve or not approve the accessorial fee after the seller provides the final accessorial notification to the marketplace.

27. An order fulfillment system as claimed in claim 24, wherein if the buyer does not approve the accessorial fee, thereby creating a dilemma, the buyer and seller may use the exception management system to resolve the dilemma.

28. An action defining system for use with a freight transportation marketplace system that comprises means for:
determining possible user actions;
determining possible user information;
determining consequences for possible user actions;
determining roles assigned to users and events;
wherein the possible user actions and the consequences of the possible user actions are defined by a role/event combination including one of the roles and one of the events; and
wherein the possible user information is defined by a role/event combination including one of the roles and one of the events; and
wherein the roles include:
at least one privilege, wherein the at least one privilege defines the possible user actions; and
at least one scope, wherein the at least one scope defines the possible user information; and
wherein the events include
at least one type; and
at least one status wherein the at least one status defines the state of the type at a point in time; and
wherein the type and status restrict the possible user actions defined by the at least one privilege and the possible user information defined by the scope and together with the privilege and scope define the consequences of the possible user actions.

29. An action defining system as claimed in claim 28 wherein each of the at least one status does not define every at least one type.

30. An action defining system as claimed in claim 28 wherein the roles comprise a buyer and a seller.

31. An action defining system as claimed in claim 30, wherein the roles are defined by an account management system.

32. An action defining system as claimed in claim 30, wherein the buyer is assigned
a privilege, wherein the privilege is purchasing freight transportation services; and
a scope, wherein the scope is information relating to purchasing freight transportation services.

33. An action defining system as claimed in claim 32, wherein the possible user actions, and the possible user information are further defined by an event and wherein the event together with the role defines the consequences of the possible user actions.

34. An action defining system as claimed in claim 33, wherein the event comprises
a type; and
a status wherein the status defines the state of the type at a point in time.

35. An action defining system as claimed in claim 34, wherein the type includes one from a group consisting of the following: order, catalog rate, auction or tender agreement.

36. An action defining system as claimed in claim 35, wherein the status includes one from a group consisting of the following: entered, auction, pending, accepted, en route, delivered, history, rejected or retracted.

37. An action defining system as claimed in claim 30, wherein the seller is assigned
a privilege, wherein the privilege is selling freight transportation services; and
a scope, wherein the scope information relating to selling freight transportation services.

* * * * *